(12) United States Patent
Ahmavaara et al.

(10) Patent No.: US 11,304,126 B2
(45) Date of Patent: *Apr. 12, 2022

(54) FIFTH GENERATION (5G) NON-STANDALONE (NSA) RADIO ACCESS SYSTEM EMPLOYING VIRTUAL FOURTH GENERATION (4G) MASTER CONNECTION TO ENABLE DUAL SYSTEM DATA CONNECTIVITY

(71) Applicant: Corning Optical Communications LLC, Charlotte, NC (US)

(72) Inventors: Kalle Ahmavaara, San Diego, CA (US); Yashodhan A Dandekar, Cupertino, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,543

(22) Filed: Jun. 29, 2020

(65) Prior Publication Data

US 2020/0329425 A1 Oct. 15, 2020

Related U.S. Application Data

(63) Continuation of application No. 16/190,395, filed on Nov. 14, 2018, now Pat. No. 10,736,025.
(Continued)

(51) Int. Cl.
*H04W 88/00* (2009.01)
*H04W 92/00* (2009.01)
(Continued)

(52) U.S. Cl.
CPC ......... *H04W 48/16* (2013.01); *H04W 72/085* (2013.01); *H04W 76/12* (2018.02);
(Continued)

(58) Field of Classification Search
CPC .............. H04B 7/0408; H04B 7/0695; H04W 72/0453; H04W 72/042; H04W 16/14; H04W 76/28; H04L 63/02
See application file for complete search history.

(56) References Cited

U.S. PATENT DOCUMENTS

2014/0050103 A1* 2/2014 Niu ................... H04W 36/0011
370/252
2015/0296392 A1* 10/2015 Chen .................... H04W 24/02
370/328
(Continued)

FOREIGN PATENT DOCUMENTS

WO 2017/062244 A1 4/2017
WO 2017/111987 A1 6/2017
(Continued)

*Primary Examiner* — Iqbal Zaidi
(74) *Attorney, Agent, or Firm* — C. Keith Montgomery

(57) ABSTRACT

Fifth generation (5G) non-standalone (NSA) radio access system employing virtual fourth generation (4G) master connection to enable dual system data connectivity. The 5G NSA radio access system employs a virtual 4G radio access node (RAN) to provide a logical master data connection to a user mobile communications device, and a 5G RAN to provide an additional, secondary high-speed data plane between the user mobile communications device to a core network. The virtual 4G RAN does not provide an actual 4G radio connection over-the-air to the user mobile communications device. Instead, the signaling transported between the user mobile communications device and the virtual 4G RAN is provided over a non-radio connection, such as an internet protocol (IP) connection. In this manner, the deployment of the 5G NSA radio access system employing the virtual 4G RAN can be achieved without updating existing 4G RANs and/or without deploying a new 4G RAN infrastructure.

18 Claims, 20 Drawing Sheets

Related U.S. Application Data

(60) Provisional application No. 62/592,523, filed on Nov. 30, 2017.

(51) Int. Cl.
*H04W 76/15* (2018.01)
*H04W 40/12* (2009.01)
*H04W 48/16* (2009.01)
*H04W 72/08* (2009.01)
*H04W 76/12* (2018.01)

(52) U.S. Cl.
CPC ........... *H04W 88/00* (2013.01); *H04W 92/00* (2013.01); *H04W 40/12* (2013.01); *H04W 76/15* (2018.02)

(56) References Cited

U.S. PATENT DOCUMENTS

2018/0146452 A1\* 5/2018 Zhang .................. H04W 48/20
2018/0288657 A1 10/2018 Stojanovski et al.

FOREIGN PATENT DOCUMENTS

WO 2017/127126 A1 7/2017
WO 2017/180194 A1 10/2017

\* cited by examiner

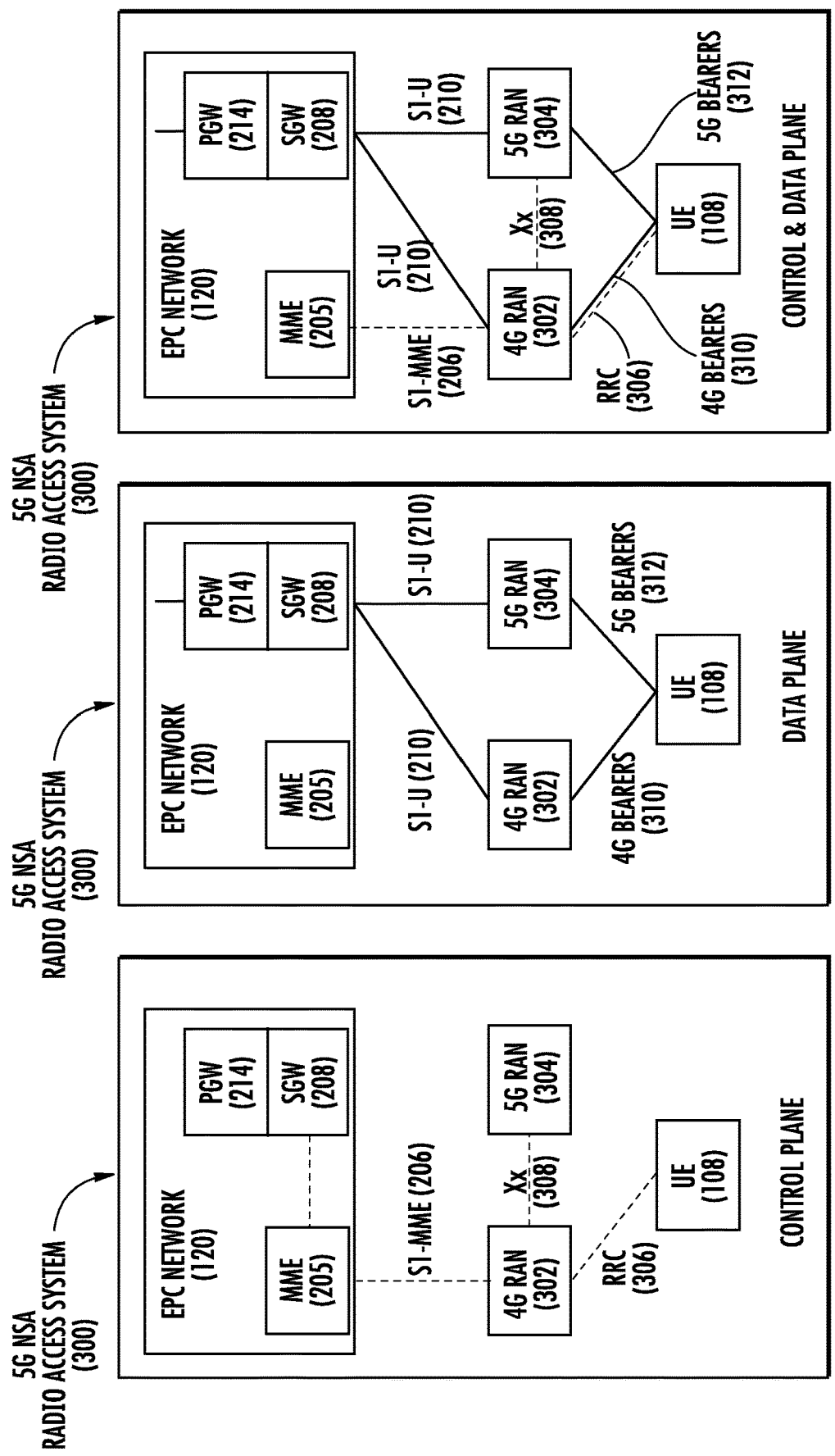

FIFTH GENERATION (5G) NON-STANDALONE (NSA) RADIO ACCESS SYSTEM EMPLOYING VIRTUAL FOURTH GENERATION (4G) MASTER CONNECTION TO ENABLE DUAL SYSTEM DATA CONNECTIVITY

CROSS-REFERENCE TO RELATED APPLICATION

This application is a continuation of U.S. patent application Ser. No. 16/190,395, filed Nov. 14, 2018, and claims the benefit of priority under 35 U.S.C. § 119(e) of U.S. Provisional Application Ser. No. 62/592,523 filed on Nov. 30, 2017, the content of which is relied upon and incorporated herein by reference in its entirety.

BACKGROUND

The disclosure relates generally to mobile communications systems and related networks, such as Universal Mobile Telecommunications Systems (UMTSs), its offspring Long Term Evolution (LTE) and $5^{th}$ Generation New Radio (5G-NR) described and being developed by the Third Generation Partnership Project (3GPP), and more particularly to a 5G non-standalone (NSA) radio access system relying on a 4G master connection to enable dual radio data connectivity.

Operators of mobile systems, such as UMTS and its offspring, including LTE and LTE-Advanced, are increasingly relying on wireless small cell radio access nodes (RANs) in order to deploy, for example, indoor voice and data services to enterprises and other customers. Such small cell RANs typically utilize multiple-access technologies capable of supporting communications with multiple users using radio frequency (RF) signals and sharing available system resources such as bandwidth and transmit power. Evolved Universal Terrestrial Radio Access (E-UTRA) is the radio interface of 3GPP's LTE upgrade path for UMTS mobile networks. In these systems, there are different frequencies where LTE (or E-UTRA) can be used, and in such systems, user mobile communications devices connect to a serving system, which is represented by a cell. In LTE, each cell is produced by a node called eNodeB (eNB).

5G radio access system specifications are being developed by 3GPP. 3GPP 5G specifications will be introduced in two phases. Phase 1 is a 5G NSA solution, and phase 2 is a standalone 5G solution (5G SA). In the phase 1 5G NSA solution, a 5G radio link is used in parallel with a 4G radio link in a dual connectivity setup. The 4G radio link is the master radio link, and the 5G radio link is the secondary radio link. The 5G secondary radio link provides an additional high speed data plane between the network and a user mobile communications device (also referred to as "user equipment (UE)"), while the 4G master radio link carries control signaling, including signaling required to establish and maintain the 5G secondary radio link. This 5G NSA solution was selected as the phase 1 solution for 5G deployment as the required amount of specification and development work is much smaller than what is required to enable a 5G SA solution where the 5G system can operate irrespectively of any 4G system.

To enable the phase 1 5G NSA solution, the UE needs to be connected to a 4G radio access system that provides the master radio link for the 4G/5G dual connectivity. The 4G radio access node (RAN) (4G RAN) (e.g., a 4G base station) of the 4G system needs to be able to exchange 5G NSA specific signaling over a direct interface with a 5G RAN (e.g., a 5G base station), such that a 5G connection between UE and the 5G RAN is managed by the 4G RAN. This 5G NSA system architecture can be achieved by either deploying a new 5G NSA compatible 4G RAN, or by using an existing 4G RAN that is updated with new features required to support the 5G NSA architecture. Both of these solutions have drawbacks. For example, deploying a new 4G RAN with new features required to support the 5G NSA architecture implies additional capital and operational expenditure, and typically requires that dedicated 4G spectrum be assigned to the new 4G RAN. Updating an existing 4G RAN to support new features required to support the 5G NSA architecture may involve significant investment to existing 4G RANs. Further, an existing 4G RAN may not support an open interface to a 5G RAN needed to exchange 5G NSA specific signaling between the 4G RAN and a 5G RAN, thus "locking in" a mobile network operator (MNO) to procure their 5G RAN from the same vendor as their 4G RAN.

No admission is made that any reference cited herein constitutes prior art. Applicant expressly reserves the right to challenge the accuracy and pertinency of any cited documents.

SUMMARY

Embodiments of the disclosure relate to fifth generation (5G) non-standalone (NSA) radio access system employing virtual fourth generation (4G) master connection to enable dual system data connectivity. The 5G NSA radio access system employs or interfaces with a virtual 4G radio access node (RAN) to provide a logical master data connection to a user mobile communications device, and a 5G RAN to provide a secondary data connection to the user mobile communications device. The secondary data connection via a 5G RAN provides an additional high-speed data plane between the user mobile communications device to a core network. In this regard, the virtual 4G RAN and the 5G RAN are connected to a core network, such as an evolved packet core (EPC) network. The virtual 4G RAN is capable to support establishment of a logical master connection with a user mobile communications device to establish a logical master data plane with the user mobile communications device. The virtual 4G RAN can use the logical master connection to provide a frequency(ies) (e.g., an Evolved Universal Terrestrial Radio Access (E-UTRA) Absolute Radio Frequency Channel Number (EARFCN)) or/and other relevant information to the user mobile communications device to discover the 5G RAN. In response to the user mobile communications device discovering the 5G RAN, the virtual 4G RAN is also capable to interface with the 5G RAN to facilitate the assignment of radio and other resources to support a secondary data connection between the user mobile communications device and the 5G RAN. In this regard, the 5G RAN is not a standalone RAN, but rather is a non-standalone RAN that relies on the virtual 4G RAN for supporting the assignment of radio and other resources to support a secondary 5G data connection for the user mobile communications device. In this manner, a secondary data connection can be established between the user mobile communications device and the 5G RAN in addition to the master data connection established through the virtual 4G RAN to support additional high speed data transfer between the user mobile communications device and the core network.

In aspects disclosed herein, the virtual 4G RAN is not an "actual" RAN, but a "virtual" RAN. This means that the virtual 4G RAN does not provide an actual 4G radio connection over-the-air to the user mobile communications device to facilitate establishment of the master connection with the user mobile communications device. Instead, the signaling transported between the user mobile communications device and the virtual 4G RAN is provided over an underlying connection, such as an internet protocol (IP) connection carried between the user mobile communications device and the virtual 4G RAN by an available transport network. The signaling protocol between the user mobile communications device and the virtual 4G RAN provides the control functionality (logical master connection) related to the 5G secondary connectivity, as is the case when an actual 4G RAN is used. In this manner, the deployment of the 5G NSA radio access system employing the virtual 4G RAN can be achieved without updating existing actual 4G RANs and/or without the need to deploy a new actual 4G RAN infrastructure. For example, use of an existing actual 4G RAN directly as the master connection would require the 4G RAN to be upgraded to include the functionality necessary to support the 5G related signaling with the user mobile communications device as well as the interface to the 5G RAN. The core network and the 5G RAN do not necessarily need to be aware that the 4G RAN used as the master connection is a virtual 4G RAN as opposed to an actual 4G RAN. Further, the core network and the 5G RAN may support multiple virtual 4G RANs, multiple actual 4G RANs, and any combinations thereof. Further, as an example, the 5G NSA radio access system employing the virtual 4G RAN can enable 5G NSA deployments without requiring use of separate 4G spectrum to support the 5G NSA devices. The 5G NSA radio access system employing the virtual 4G RAN can also enable vendors to provide a 5G NSA solution that operates without requiring any updates to a 4G network. Mobile operations can deploy a 5G NSA solution that is independent of their current 4G infrastructure vendors.

An additional embodiment of the disclosure relates to a user mobile communications device. The user mobile communications device is configured to establish a transport connection on a network. The user mobile communications device is also configured to discover a virtual RAN in a first virtual radio access system on the network over the transport connection. The user mobile communications device is also configured to exchange information through the transport connection over the network with the virtual RAN related to a secondary RAN in a second radio access system. The user mobile communications device is also configured to establish a secondary connection to the secondary RAN based on the exchanged information with the virtual RAN.

An additional embodiment of the disclosure relates to a method of operating a user mobile communications device in dual connectivity between a master connection to a virtual RAN in a first virtual radio access system and a secondary connection to a secondary RAN in a second radio access system. The method comprises the user mobile communications device establishing a transport connection on a network. The method also comprises the user mobile communications device discovering the virtual RAN in the first virtual radio access system on the network over the transport connection. The method also comprises the user mobile communications device exchanging information through the transport connection over the network with the virtual RAN related to the secondary RAN in the second radio access system. The method also comprises the user mobile communications device establishing a secondary connection to the secondary RAN based on the exchanged information with the virtual RAN An additional embodiment of the disclosure relates to virtual RAN for supporting and establishing a dual connection for a user mobile communications device of a master connection to a virtual RAN in a first virtual radio access system and a secondary connection to a secondary RAN. The virtual RAN is configured to establish a master connection between the user mobile communications device and the first virtual radio access system over a transport connection. The virtual RAN is also configured to receive a report comprising information related to the secondary RAN in a second radio access system by the user mobile communications device. The virtual RAN is also configured to receive radio resource configuration information from the secondary RAN to support the secondary connection between the secondary RAN and the user mobile communications device. The virtual RAN is also configured to communicate at least part of the radio resource configuration information to the user mobile communications device for the user mobile communications device to establish the secondary connection to the secondary RAN.

An additional embodiment of the disclosure relates to a method of operating a virtual RAN in a first virtual radio access system to establish a master connection between a user mobile communications device to the virtual RAN and a secondary connection to a secondary RAN in a second radio access system. The method also comprises establishing a master connection between the user mobile communications device and the first virtual radio access system over a transport connection. The method also comprises receiving a report comprising information related to the secondary RAN in the second radio access system by the user mobile communications device. The method also comprises receiving radio resource configuration information from the secondary RAN to support the secondary connection between the secondary RAN and the user mobile communications device. The method also comprises communicating at least part of the radio resource configuration information to the user mobile communications device for the user mobile communications device to establish the secondary connection to the secondary RAN.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3A illustrates a fifth generation (5G) non-standalone (NSA) (5G NSA) radio access system and control plane therein, wherein the 5G NSA radio access system includes a fourth generation (4G) radio access node (RAN) to provide a 4G master connection for signaling and data transfer based on 4G radio technology to a user mobile communications device, and 5G RAN to provide a secondary data connection based on 5G radio technology to the user mobile communications device;

FIG. 3B illustrates a data plane supported by the 5G NSA radio access system in FIG. 3A;

FIG. 3C illustrates the control plane and data plane supported by the 5G NSA radio access system in FIG. 3A;

DETAILED DESCRIPTION

Figure 1:
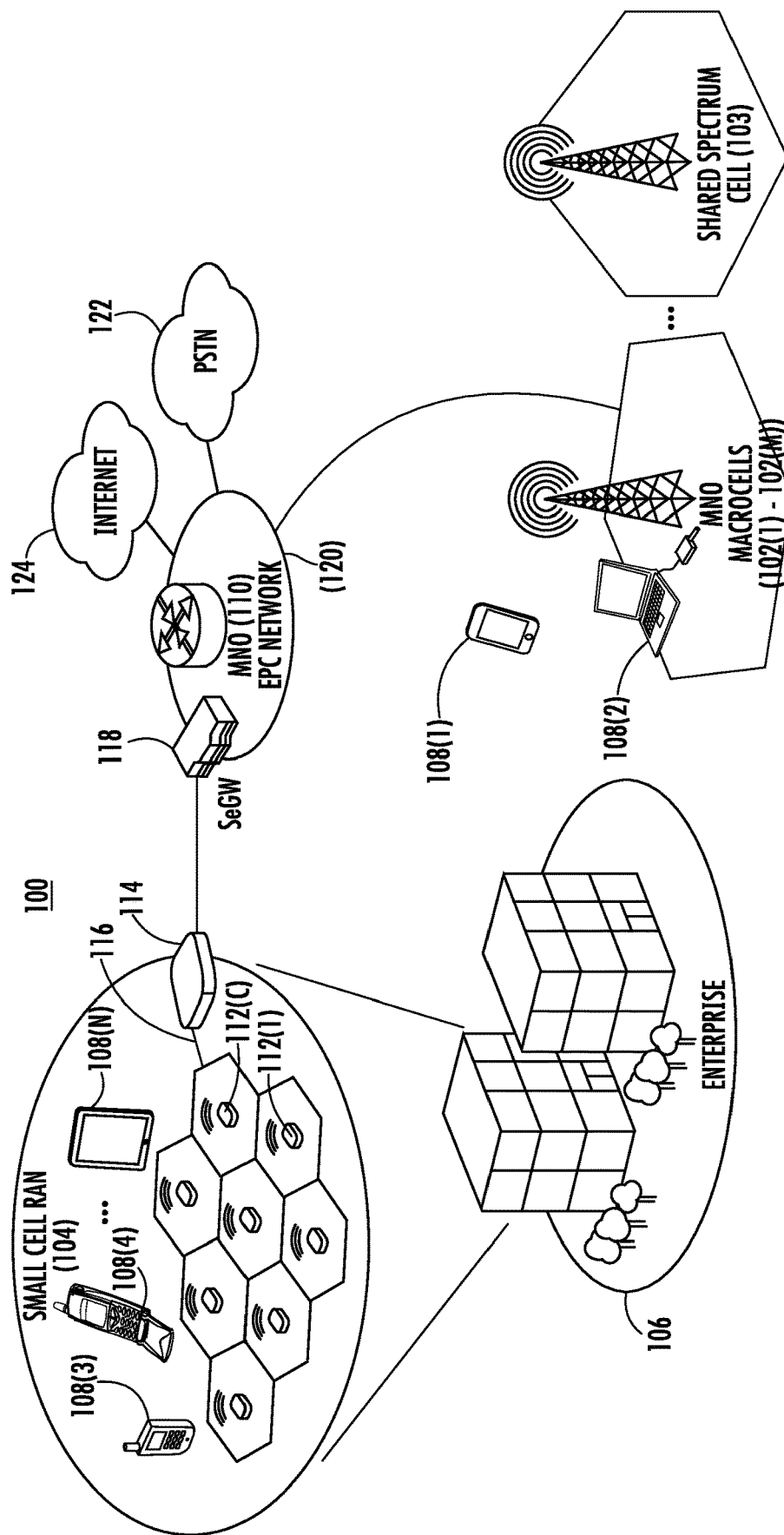
FIG. 1 is a diagram of an exemplary mobile telecommunications environment that includes an exemplary macrocell radio access network (RAN) and an exemplary small cell RAN located within an enterprise environment and configured to service mobile communications between a user mobile communications device to a mobile network operator (MNO)

Embodiments of the disclosure relate to fifth generation (5G) non-standalone (NSA) radio access system employing virtual fourth generation (4G) master connection to enable dual system data connectivity. The 5G NSA radio access system employs or interfaces with a virtual 4G radio access node (RAN) to provide a logical master data connection to a user mobile communications device, and a 5G RAN to provide a secondary data connection to the user mobile communications device. The secondary data connection via a 5G RAN provides an additional high-speed data plane between the user mobile communications device to a core network. In this regard, the virtual 4G RAN and the 5G RAN are connected to a core network, such as an evolved packet core (EPC) network. The virtual 4G RAN is capable to support establishment of a logical master connection with a user mobile communications device to establish a logical master data plane with the user mobile communications device. The virtual 4G RAN can use the logical master connection to provide a frequency(ies) (e.g., an Evolved Universal Terrestrial Radio Access (E-UTRA) Absolute Radio Frequency Channel Number (EARFCN)) or/and other relevant information to the user mobile communications device to discover the 5G RAN. In response to the user mobile communications device discovering the 5G RAN, the virtual 4G RAN is also capable to interface with the 5G RAN to facilitate the assignment of radio and other resources to support a secondary data connection between the user mobile communications device and the 5G RAN. In this regard, the 5G RAN is not a standalone RAN, but rather is a non-standalone RAN that relies on the virtual 4G RAN for supporting the assignment of radio and other resources to support a secondary 5G data connection for the user mobile communications device. In this manner, a secondary data connection can be established between the user mobile communications device and the 5G RAN in addition to the master data connection established through the virtual 4G RAN to support additional high speed data transfer between the user mobile communications device and the core network.

In aspects disclosed herein, the virtual 4G RAN is not an "actual" RAN, but a "virtual" RAN. This means that the virtual 4G RAN does not provide an actual 4G radio connection over-the-air to the user mobile communications device to facilitate establishment of the master connection with the user mobile communications device. Instead, the signaling transported between the user mobile communications device and the virtual 4G RAN is provided over an underlying connection, such as an internet protocol (IP) connection carried between the user mobile communications device and the virtual 4G RAN by an available transport network. The signaling protocol between the user mobile communications device and the virtual 4G RAN provides the control functionality (logical master connection) related to the 5G secondary connectivity, as is the case when an actual 4G RAN is used. In this manner, the deployment of the 5G NSA radio access system employing the virtual 4G RAN can be achieved without updating existing actual 4G RANs and/or without the need to deploy a new actual 4G RAN infrastructure. For example, use of an existing actual 4G RAN directly as the master connection would require the 4G RAN to be upgraded to include the functionality necessary to support 5G related signaling with the user mobile communications devices as well as the interface to the 5G RAN. The core network and the 5G RAN do not necessarily need to be aware that the 4G RAN used as the master connection is a virtual 4G RAN as opposed to an actual 4G RAN. Further, the core network and the 5G RAN may support multiple virtual 4G RANs, multiple actual 4G RANs, and any combinations thereof. Further, as an example, the 5G NSA radio access system employing the virtual 4G RAN can enable 5G NSA deployments without requiring use of separate 4G spectrum to support the 5G NSA devices. The 5G NSA radio access system employing the virtual 4G RAN can also enable vendors to provide a 5G NSA solution that operates without requiring any updates to a 4G network. Mobile operations can deploy a 5G NSA solution that is independent of their current 4G infrastructure vendors.

Figure 2:
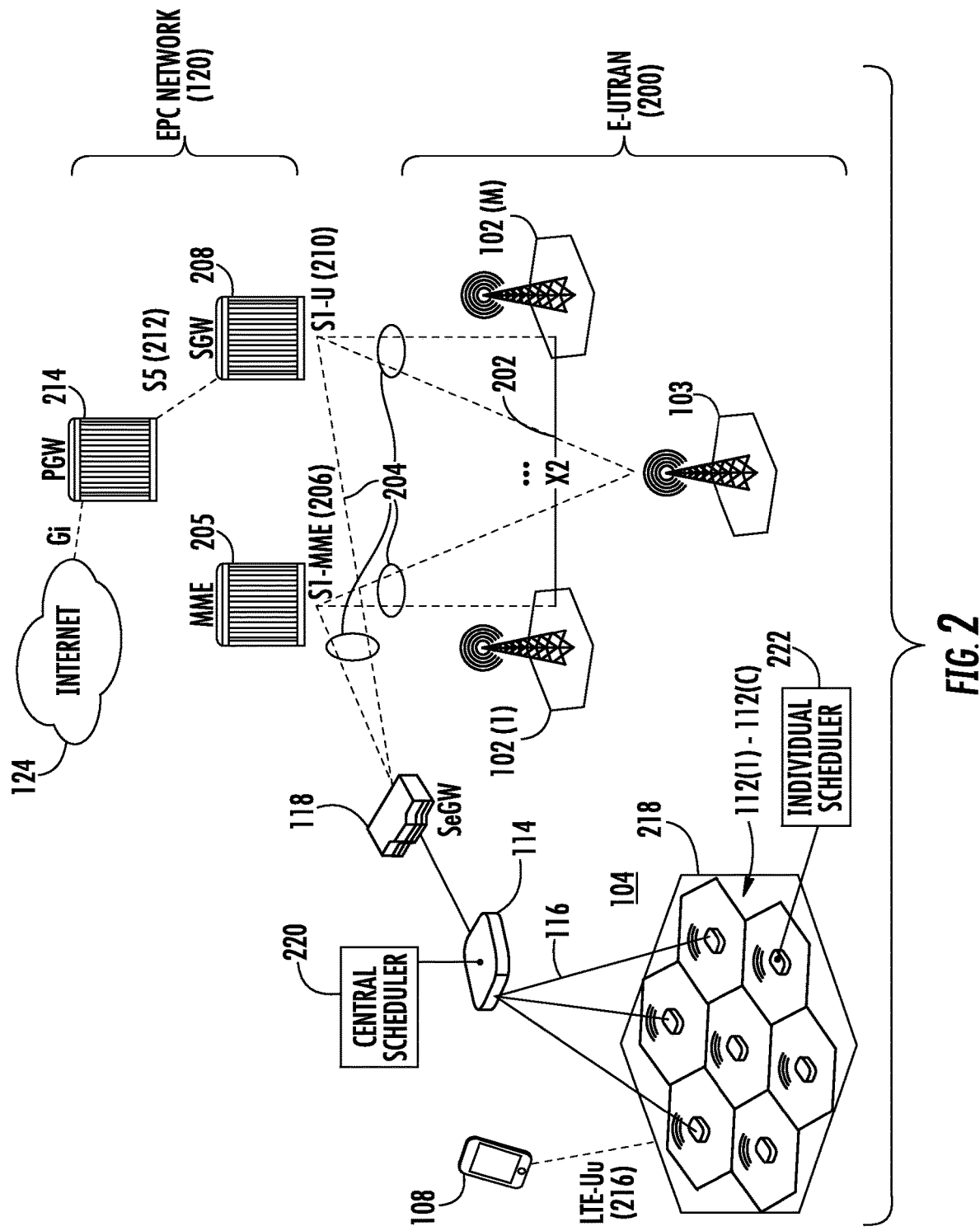
FIG. 2 illustrates exemplary details of an evolved packet core (EPC) and Evolved Universal Mobile Telecommunications System (UMTS) Terrestrial Radio Access Network (E-UTRAN) arranged under Long Term Evolution (LTE) for the mobile telecommunications environment in FIG. 1.

Before discussing examples of a 5G NSA radio access system employing a virtual 4G RAN to provide a logical 4G master connection and 5G secondary connection to a user mobile communications device to establish master and secondary data planes between the user mobile communications device and a core network, an example of a mobile telecommunications environment that involves RANs for establishing connections between user mobile communications devices and a core network is first discussed below with regard to FIGS. 1 and 2. FIGS. 3A-6B discuss a 5G NSA radio access system that does not employ a virtual 4G RAN for establishing a logical 4G master connection to setup a 5G secondary connection to a user mobile communications device to establish master and secondary data planes between the user mobile communication device and a core network. FIGS. 7-13B discuss a 5G NSA radio access system that employs a virtual 4G RAN for establishing a logical 4G master connection and a 5G secondary connection to a user mobile communications device to establish master and secondary data planes between the user mobile communications device and a core network.

In this regard, FIG. 1 is a schematic diagram of an exemplary mobile telecommunications environment 100 (also referred to as "environment 100") that includes exemplary macrocell radio access networks (RANs) 102(1)-102(M) ("macrocells 102(1)-102(M)") and an exemplary small cell RAN 104 located within an enterprise environment 106 and configured to service mobile communications between a user mobile communications device 108(1)-108(N) to a mobile network operator (MNO) 110. As discussed above and in more detail below, the user mobile communications devices 108(1)-108(N) can be configured to discover neighbor radio access systems to be reported to a serving RAN. A serving RAN for a user mobile communications device 108(1)-108(N) is a RAN or cell in the RAN in which the user mobile communications devices 108(1)-108(N) have an established communications session with the exchange of mobile communications signals for mobile communications. Thus, a serving RAN may also be referred to herein as a serving cell. For example, the user mobile communications devices 108(3)-108(N) in FIG. 1 are being serviced by the small cell RAN 104, whereas user mobile communications devices 108(1) and 108(2) are being serviced by the macrocell 102(1)-102(M). The macrocell 102(1)-102(M) is a mobile network operation (MNO) macrocell in this example. However, a shared spectrum RAN 103 (also referred to as "shared spectrum cell 103") includes a macrocell in this example and supports communications on frequencies that are not solely licensed to a particular MNO and thus may service user mobile communications devices 108(1)-108(N) independent of a particular MNO. For example, the shared spectrum cell 103 may be operated by a third party that is not an MNO and wherein the shared spectrum cell 103 support citizens broadband radio service (CBRS). Also, as shown in FIG. 1, the MNO macrocell 102(1)-102(M), the shared spectrum cell 103, and the small cell RAN 104 may be neighboring radio access systems to each other, meaning that some or all can be in proximity to each other such that a user mobile communications device 108(3)-108(N) may be able to be in communications range of two or more of the MNO macrocell 102(1)-102(M), the shared spectrum cell 103, and the small cell RAN 104 depending on the location of user mobile communications devices 108(3)-108(N).

In the mobile telecommunications environment 100, a serving RAN (e.g., an Evolved Node B (eNB) in such system) provides a measurement configuration to the user mobile communications devices 108(1)-108(N) to "point" the receiver of the user mobile communications device 108(1)-108(N) to find other systems (e.g., neighbor cells) transmitting at a specified frequency(ies) (e.g., at 1900 MHz, 2500 MHz) according to the measurement configuration that the user mobile communications device 108(1)-108(N) should measure. The measurement of communications signals of other RANs by the user mobile communications device 108(1)-108(N) at specified frequencies is performed for a variety of purposes, including inter-frequency mobility and inter-frequency measurements. The user mobile communications devices 108(1)-108(N) can find these communications systems and perform actions, such as cell selection in the idle mode and sending of measurement reports (e.g., Measurement Report Messages (MRMs)) in the active mode. These measurement reports can be used by the serving RAN (e.g., MNO macrocell 102, shared spectrum cell 103, small cell RAN 104) to, for example, trigger handovers or to gather information about neighbor cells through Automatic Neighbor Relation (ANR) discovery. For example, the MNO macrocell 102(1)-102(M) may use the MRMs for cell reselection to cause a user mobile communications device 108(1)-108(N) to be serviced by a different cell controlled by the MNO, such as the small cell RAN 104 for example, for optimizing communications. In idle mode, this measurement configuration is delivered in a System Information broadcast, which is used by the MNO macrocell 102(1)-102(M) to indicate, point out, and/or determine systems and frequencies in the pertinent area. In active mode, this measurement configuration may also be delivered in user mobile communications device-specific radio resource control signaling messages to service user mobile communications devices 108(1)-108(N) that indicate to the user mobile communications devices 108(1)-108(N) the appropriate measurement configuration parameters. In these measurement configuration parameters, there are specific instructions about what frequencies the serviced user mobile communications device 108(1)-108(N) should measure. The information measured by the user mobile communications devices 108(1)-108(N) is then reported back to the serving RAN. For example, the MNO macrocell 102(1)-102(M) as a serving RAN may use the measurement report information to determine if other systems of higher priority exist.

With continuing reference to FIG. 1, the mobile telecommunications environment 100 in this example is arranged as an LTE (Long Term Evolution) system as described by the Third Generation Partnership Project (3GPP) as an evolution of the Global System for Mobile communication/Universal Mobile Telecommunications System (GSM/UMTS) standards. It is emphasized, however, that the aspects described herein may also be applicable to other network types and protocols. The mobile telecommunications environment 100 includes the enterprise environment 106 in which the small cell RAN 104 is implemented. The small cell RAN 104 includes a plurality of small cell radio nodes 112(1)-112(C). Each small cell radio node 112(1)-112(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

The size of the enterprise environment 106 and the number of cells deployed in the small cell RAN 104 may vary. In typical implementations, the enterprise environment 106 can be from 50,000 to 500,000 square feet and encompass multiple floors, and the small cell RAN 104 may support hundreds to thousands of users using mobile communications platforms such as mobile phones, smartphones, tablet computing devices, and the like shown as the user mobile communications devices 108(3)-108(N). However, the foregoing is intended to be illustrative and the solutions described herein can be typically expected to be readily scalable either upwards or downwards as the needs of a particular usage scenario demand.

In FIG. 1, the small cell RAN 104 includes one or more services nodes (represented as a single services node 114 in FIG. 1) that manage and control the small cell radio nodes 112(1)-112(C). In alternative implementations, the management and control functionality may be incorporated into a radio node, distributed among nodes, or implemented remotely (i.e., using infrastructure external to the small cell RAN 104). The small cell radio nodes 112(1)-112(C) are coupled to the services node 114 over a direct or local area network (LAN) connection 116 as an example typically using secure IPsec tunnels. The services node 114 aggregates voice and data traffic from the small cell radio nodes 112(1)-112(C) and provides connectivity over an IPsec tunnel to a security gateway (SeGW) 118 in an Evolved Packet Core (EPC) 120 network of the MNO 110. The EPC 120 is typically configured to communicate with a public switched telephone network (PSTN) 122 to carry circuit-switched traffic, as well as for communicating with an external packet-switched network such as the Internet 124.

The environment 100 also generally includes Evolved Node B (eNB) base station, or "macrocell" 102. The radio coverage area of the macrocell 102(1)-102(M) is typically much larger than that of a small cell where the extent of coverage often depends on the base station configuration and surrounding geography. Thus, a given user mobile communications device 108(3)-108(N) may achieve connectivity to the EPC network 120 through either a macrocell 102(1)-

102(M) or small cell radio node 112(1)-112(C) in the small cell RAN 104 in the environment 100.

Along with macrocell 102, the small cell RAN 104 forms an access network (i.e., an Evolved UMTS Terrestrial Radio Access Network (E-UTRAN)) under 3GPP as represented by reference numeral 200 in FIG. 2. As shown in FIG. 2, there is no centralized controller in the E-UTRAN 200, hence an LTE network architecture is commonly said to be "flat." Macrocells 102(1)-102(M) are typically interconnected using an X2 interface 202. The shared spectrum cell 103 may or may not be interconnected to the macrocells 102(1)-102(M) through the X2 interface 202. The macrocells 102(1)-102(M) and shared spectrum cell 103 are also typically connected to the EPC network 120 by means of an S1 interface 204. More particularly, the macrocells 102(1)-102(M) and the shared spectrum cell 103 are connected to a Mobility Management Entity (MME) 205 in the EPC network 120 using an S1-MME interface 206, and to a Serving Gateway (SGW) 208 using an S1-U interface 210. An S5 interface 212 couples the SGW 208 to a Packet Data Network Gateway (PGW) 214 in the EPC network 120 to provide the user mobile communications devices 108 with connectivity to the Internet 124. A user mobile communications device 108 can connect to the small cell radio nodes 112(1)-112(C) in the small cell RAN 104 over an LTE-Uu interface 216.

The macrocells 102(1)-102(M), the shared spectrum cell 103, and the small cell RAN 104 are connected to the MME 205 and SGW 208 in the EPC network 120 using the appropriate S1 interface connections 204. Accordingly, as each of the small cell radio nodes 112(1)-112(C) in the small cell RAN 104 is operatively coupled to the services node 114 over the LAN connection 116, the communications connections from the small cell radio nodes 112(1)-112(C) are aggregated to the EPC network 120. Such aggregation preserves the flat characteristics of the LTE network while reducing the number of S1 interface connections 204 that would otherwise be presented to the EPC network 120. Thus, the small cell RAN 104 essentially appears as a single eNB 218 to the EPC network 120, as shown. The services node 114 in the small cell RAN 104 includes a central scheduler 220. The small cell radio nodes 112(1)-112(C) may also be configured to support individual schedulers 222.

A user mobile communications device 108 connected to the environment 100 will actively or passively monitor a cell in a macrocell 102(1)-102(M) in the E-UTRAN 200 in the communications range of the user mobile communications device 108 as the user mobile communications device 108 moves throughout the environment 100. Such a cell is termed the "serving cell." For example, if user mobile communications device 108 is in communication through an established communications session with a particular small cell radio node 112(1)-112(C) in the small cell RAN 104, the particular small cell radio node 112(1)-112(C) will be the serving cell to the user mobile communications device 108, and the small cell RAN 104 will be the serving RAN. The user mobile communications device 108 will continually evaluate the quality of a serving cell as compared with that of a neighboring cell in the small cell RAN 104 and/or the shared spectrum cell 103. A neighbor cell is a cell among the small cell RAN 104, MNO macrocells 102(1)-102(M), and/or the shared spectrum cell 103 that is not in control of the active communications session for a given user mobile communications device 108, but is located in proximity to a serving cell to a user mobile communications device 108 such that the user mobile communications device 108 could be in communications range of both its serving cell and the neighbor cell. Both small cell radio nodes 112(1)-112(C), the macrocells 102(1)-102(M), and the shared spectrum cell 103 can identify themselves to a user mobile communications device 108 using a respective unique Physical Cell Identity (PCI) and a public land mobile network (PLMN) identification (ID) (PLMN ID) that are transmitted over a downlink to the user mobile communications device 108. Each of the small cell radio nodes 112(1)-112(C), the MNO macrocells 102(1)-102(M), and the shared spectrum cell 103 can assign a physical channel identity (PCI) that allows user mobile communications device 108 to distinguish adjacent cells. As such, the PCIs 226(1)-226(M), 228, 230(1)-230(C) are uniquely assigned among neighboring cells, but can be reused across geographically separated cells.

Before discussing examples of a 5G NSA radio access system in FIG. 7-13 employing a virtual 4G RAN to provide a logical 4G master connection and 5G secondary connection to a user mobile communications device to establish a master and secondary data planes between the user mobile communications device and a core network, an example of a 5G NSA radio access system that does not employ a virtual 4G RAN for establishing a logical 4G master connection and to setup a 5G secondary connection to a user mobile communications device is first discussed in regard to FIGS. 3A-6 below.

FIGS. 3A-3C illustrate a fifth generation (5G) non-standalone (NSA) (5G NSA) radio access system 300 and control and data planes therein. The 5G NSA radio access system 300 includes or interfaces with an actual 4G RAN 302 in a virtual 4G radio access system to provide an over-the-air radio 4G master connection for signaling and data transfer based on 4G radio technology to a user mobile communications device 108 (labeled as "UE 108"). The 5G NSA radio access system 300 also includes a 5G RAN 304 in a 5G radio access system to provide a secondary data connection based on 5G radio technology to the user mobile communications device 108. The master and secondary connections established between the 5G NSA radio access system 300 and the user mobile communications device 108 establish data planes between the user mobile communications device 108 and the EPC network 120 (see also FIGS. 1 and 2). As discussed in more detail below, the 5G NSA radio access system 300 is able to establish a connection between a user mobile communications device 108 and the EPC network 120 via a dual connectivity setup, in which the 4G RAN 302 provides the master connection based on 4G radio technology and the 5G RAN 304 provides a secondary connection based on 5G radio technology. The user mobile communications device 108 that is configured to support the 5G NSA radio system 300 is able to utilize the dual connectivity setup to transfer data between itself and the EPC network 120. Having the 5G radio technology based secondary connection operating in parallel to the 4G master connection enables higher bandwidth for the overall dataflow between the user mobile communications device 108 and the EPC network 120.

FIG. 3A illustrates a control plane supported by the 5G NSA radio access system 300 and established between the user mobile communications device 108 and the EPC network 120. Control signaling 306 (e.g., radio resource control (RRC) signaling) between the user mobile communications device 108 and the EPC network 120 is carried over the 4G master connection. This control signaling 306 includes also the signaling related to the discovery, establishment, maintenance, and tear down of the 5G radio technology based secondary connection between the user mobile communications device 108 and the 5G RAN 304 in the 5G radio access system. To facilitate this 5G related signaling between the user mobile communications device 108 and the 4G RAN 302, an Xx signaling interface 308 exists within the network between the 4G RAN 302 and the 5G RAN 304. The Xx signaling interface 308 is utilized by the 4G RAN 302 to request and receive 5G radio configuration for a user mobile communications device 108 for which a 5G secondary based radio connection is being established or modified.

FIG. 3B illustrates a data plane established between the user mobile communications device 108 and the EPC network 120 in the 5G NSA radio access system 300. Typically, some of the data plane bearers are transported as 4G bearers 310 based on 4G radio technology, via the 4G master connection through the 4G RAN 302, and the rest of the data plane bearers are 5G bearers 312 based on 5G radio technology routed via the 5G secondary connection through the 5G RAN 304. As shown in FIG. 3B, the 4G and 5G data bearers 310, 312 are transported between the EPC network 120 and the user mobile communications device 108 directly via the appropriate 4G RAN or 5G RAN 302, 304. In other configurations not illustrated, it is possible to transport the 5G data bearers 312 via the 4G RAN 302. It is also possible to have data bearers that are split (e.g., transported partly) via the 4G RAN 302 and the 5G RAN 304. FIG. 3C illustrates both the control plane and data plane supported by the 5G NSA radio access system 300 and established between the user mobile communications device 108 and the EPC network 120 shown in FIGS. 3A and 3B.

Figure 4A:
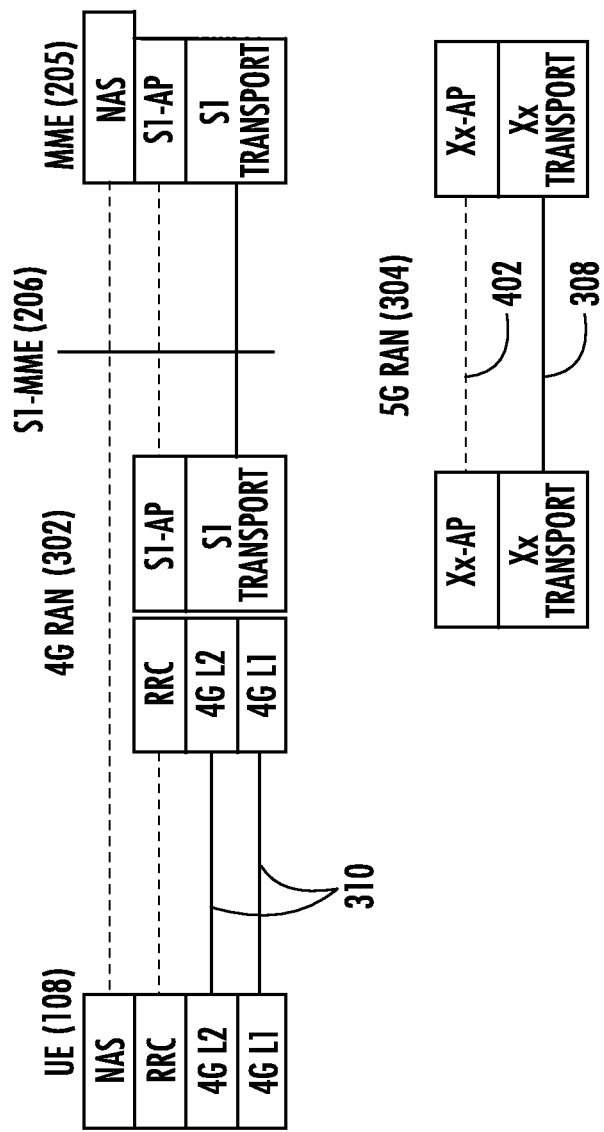
FIG. 4A is a block diagram illustrating an exemplary 5G NSA control plane protocol stack implemented in the 5G NSA radio access system in FIGS. 3A-3C, wherein control signaling is provided between the 4G RAN and the user mobile communications device to setup and control radio resources to establish the 4G master data connection to the user mobile communications device, and between the 4G RAN and the 5G RAN to establish the 5G secondary data connection to the user mobile communications device.

FIG. 4A is a block diagram illustrating an exemplary control plane protocol stack 400 that can be implemented in the 5G NSA radio access system 300 in FIGS. 3A-3C. As shown in the control plane protocol stack 400, the control signaling is provided between the 4G RAN 302 and the user mobile communications device 108 to setup and control radio resources to establish the 4G master data connection to the user mobile communications device 108, and between the 4G RAN 302 and the 5G RAN 304 to facilitate establishment, management, and tear down of the 5G secondary data connection to the user mobile communications device 108. As shown in FIG. 4A, a 4G radio technology based L1+L2 connection exists between the user mobile communications device 108 and the 4G RAN 302. This connection is used to carry RRC signaling 306 (see FIGS. 3A and 3C) between the user mobile communications device 108 and the 4G RAN 302. The RRC signaling 306 is utilized to setup and control the radio resources associated with the 4G radio connection as well as with the 5G connection. The 4G radio connection is used to also exchange NAS signaling between the user mobile communications device 108 and the MME 205 within the EPC network 120. NAS signaling includes, for example, authentication signaling. Within the 5G NSA radio access system 300, the 4G RAN 302 and the 5G RAN 304 interact with each other using the Xx signaling interface 308 and Xx-AP signaling 402. The Xx-AP signaling 402 is used, for example, to exchange 5G radio resource related information between the 4G RAN 302 and the 5G RAN 304. For example, the 4G RAN 302 may use the Xx signaling interface 308 to request radio resources from the 5G RAN 304 for a specific user mobile communications device 108. The 5G RAN 304 allocates appropriate 5G radio resources for the user mobile communications device 108 and informs the 4G RAN 302 about the allocated radio resources. The 4G RAN 302 conveys the 5G radio resource information to the user mobile communications device 108. Based on the received information, a 5G radio link between the user mobile communications device 108 and the 5G RAN 304 can be established. This 5G radio link may act as the secondary radio link for the dual connectivity to the user mobile communications device 108 in the 5G NSA radio access system 300.

Figure 4B:
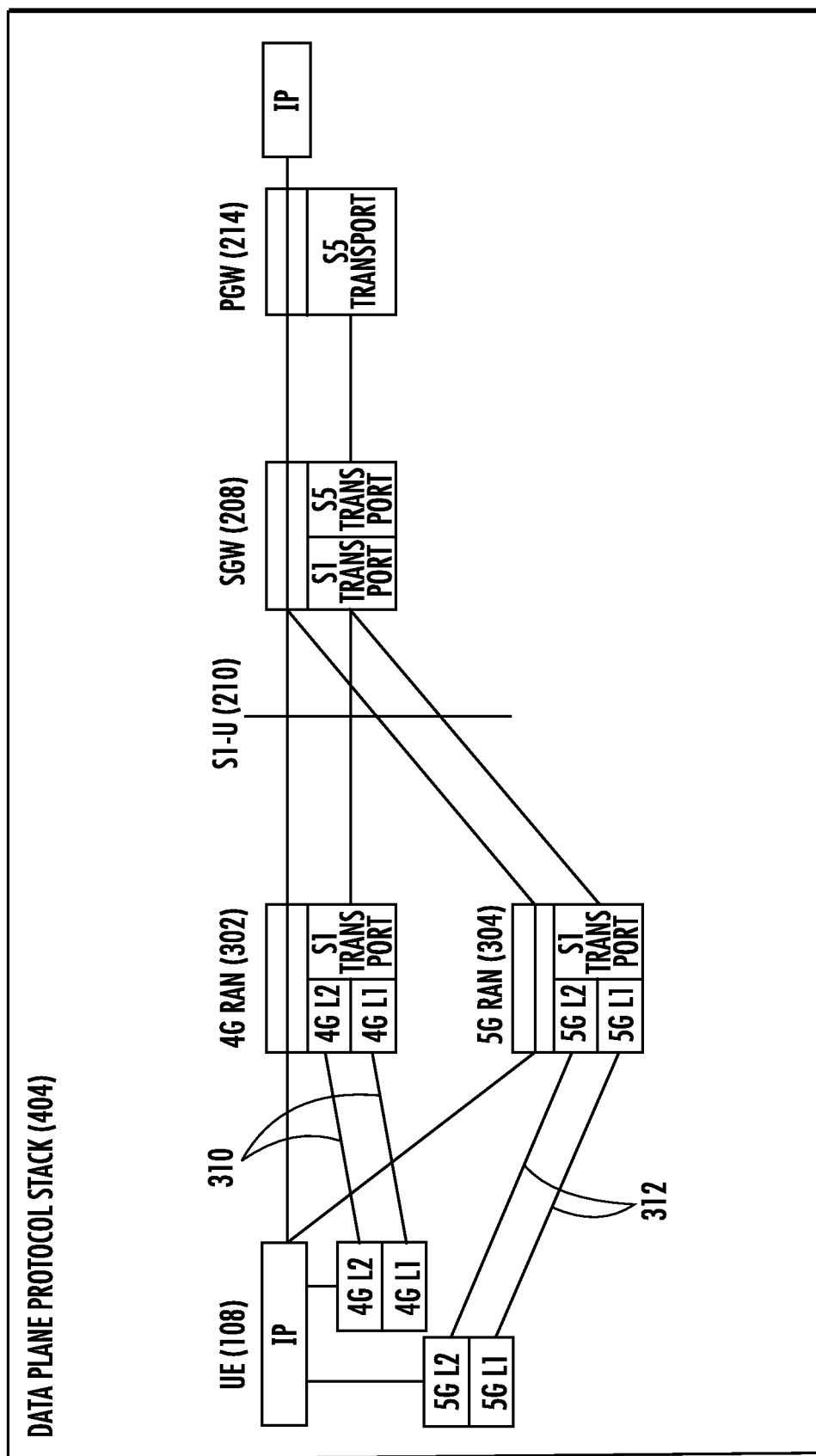
FIG. 4B is a block diagram illustrating an exemplary 5G NSA data plane protocol stack implemented in the 5G NSA radio access system in FIGS. 3A-3C, wherein data paths are provided between the 4G RAN and the user mobile communications device for a 4G master data connection, and between the 5G RAN and the user mobile communications device for 5G secondary data connection.

FIG. 4B is a block diagram illustrating an exemplary data plane protocol stack 404 that can be implemented in the 5G NSA radio access system 300 in FIGS. 3A-3C. The data plane protocol stack 404 supports establishing data paths between the 4G RAN 302 and the user mobile communications device 108 for a 4G master data connection, and between the 5G RAN 304 and the user mobile communications device 108 for 5G secondary data connection. The data plane protocol stack 404 supports a data plane carrying IP traffic via data plane specific layer 2 connections. Between the user mobile communications device 108 and the SGW 208, the data plane has two possible paths. One path goes via the 4G RAN 302, and the other path goes via the 5G RAN 304. Between the user mobile communications device 108 and the 4G RAN 302, the 4G bearers 310 are used. Between the user mobile communications device 108 and the 5G RAN 304, the 5G bearers 312 are used. The 4G RAN 302 is responsible for deciding which IP traffic is routed via which RAN between the 4G RAN 302 and the 5G RAN 304. This decision is implemented via the control plane functions, as illustrated in FIG. 4A.

Figure 5:
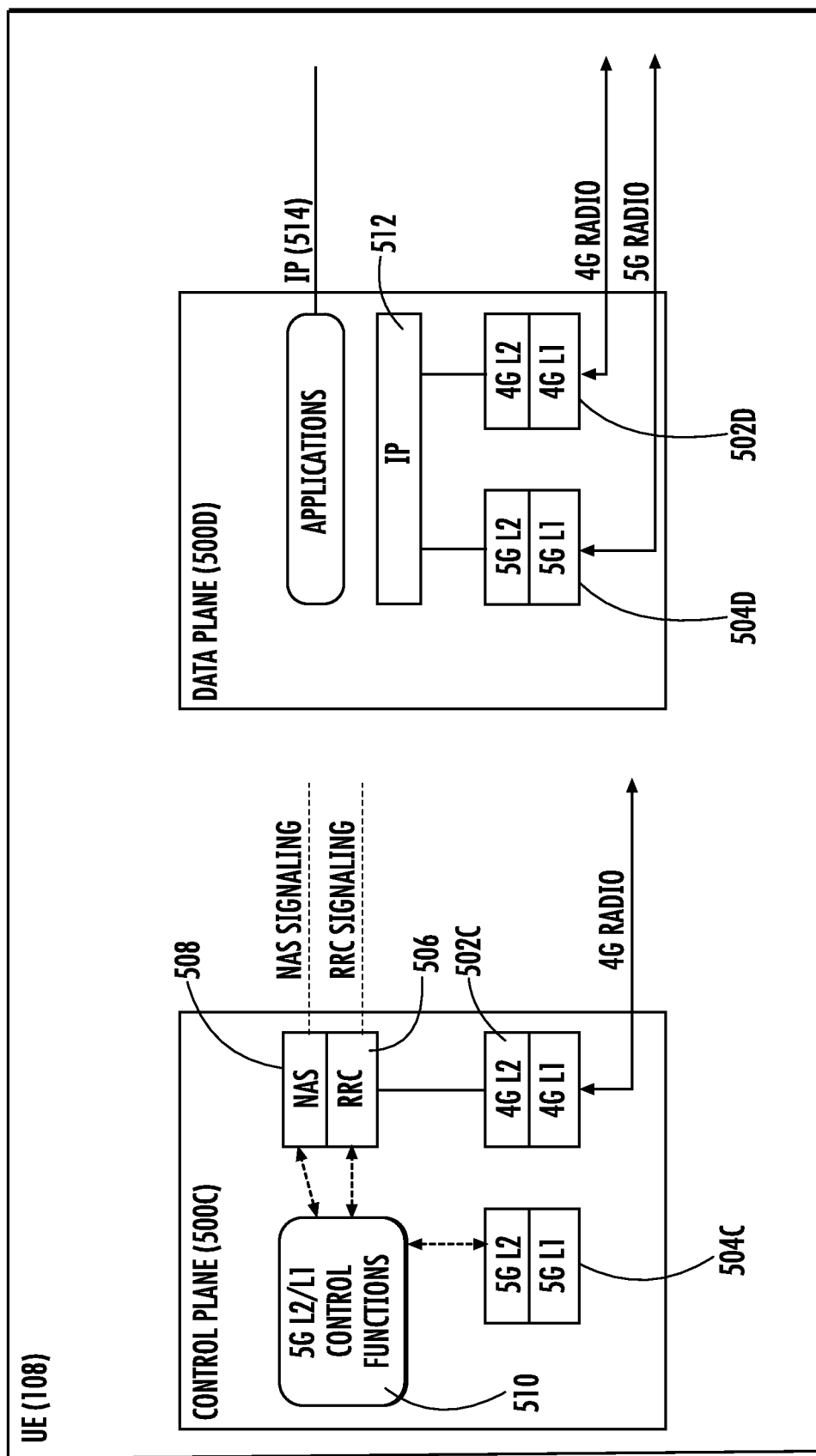
FIG. 5 is a diagram illustrating exemplary control plane and data plane circuits that can be provided in a user mobile communications device to support connectivity to the 5G NSA radio access system in FIGS. 3A-3C.

FIG. 5 is a diagram illustrating exemplary control plane and data plane circuits that can be provided in a user mobile communications device 108 to support connectivity to the 5G NSA radio access system 300 in FIGS. 3A-3C. Note that an actual user mobile communications device 108 implementation may be different from this example provided for illustrative purposes. As shown in FIG. 5, the user mobile communications device 108 includes a control plane 500C that includes 4G L2/L1 control circuit(s) 502C to provide 4G L2/L1 functions enabling transporting control plane between the user mobile communications device 108 and the 4G RAN 302. The control plane 500C also includes 5G L2/L1 control circuit(s) 504C to provide 5G L2/L1 control functions 510 enabling transporting control plane between the user mobile communications device 108 and the 5G RAN 304. 4G control plane Layer 3 signaling termination functions, namely RRC 506 and NAS 508, are supported. RRC termination enables Layer 3 control plane 500C signaling with the 4G RAN 302. NAS termination enables control plane 500C signaling with the EPC network 120. The user mobile communications device 108 also includes a data plane 500D that includes 4G L2/L1 data circuit(s) 502D to provide 4G L2/L1 functions enabling transporting data plane between the user mobile communications device 108 and the 4G RAN 302. 5G L2/L1 data circuits 504D are provided in the control plane 500C to configure and manage the 5G L2/L1 functionality based on the instructions received via the 4G control plane 500C Layer 3 signaling. IP termination circuit(s) 512 enabled to carry application specific IP data 514 to and from the EPC network 120 using 4G L2/L1 data circuit(s) 502D or/and 5G L2/L1 data circuits 504D.

Figure 6A:
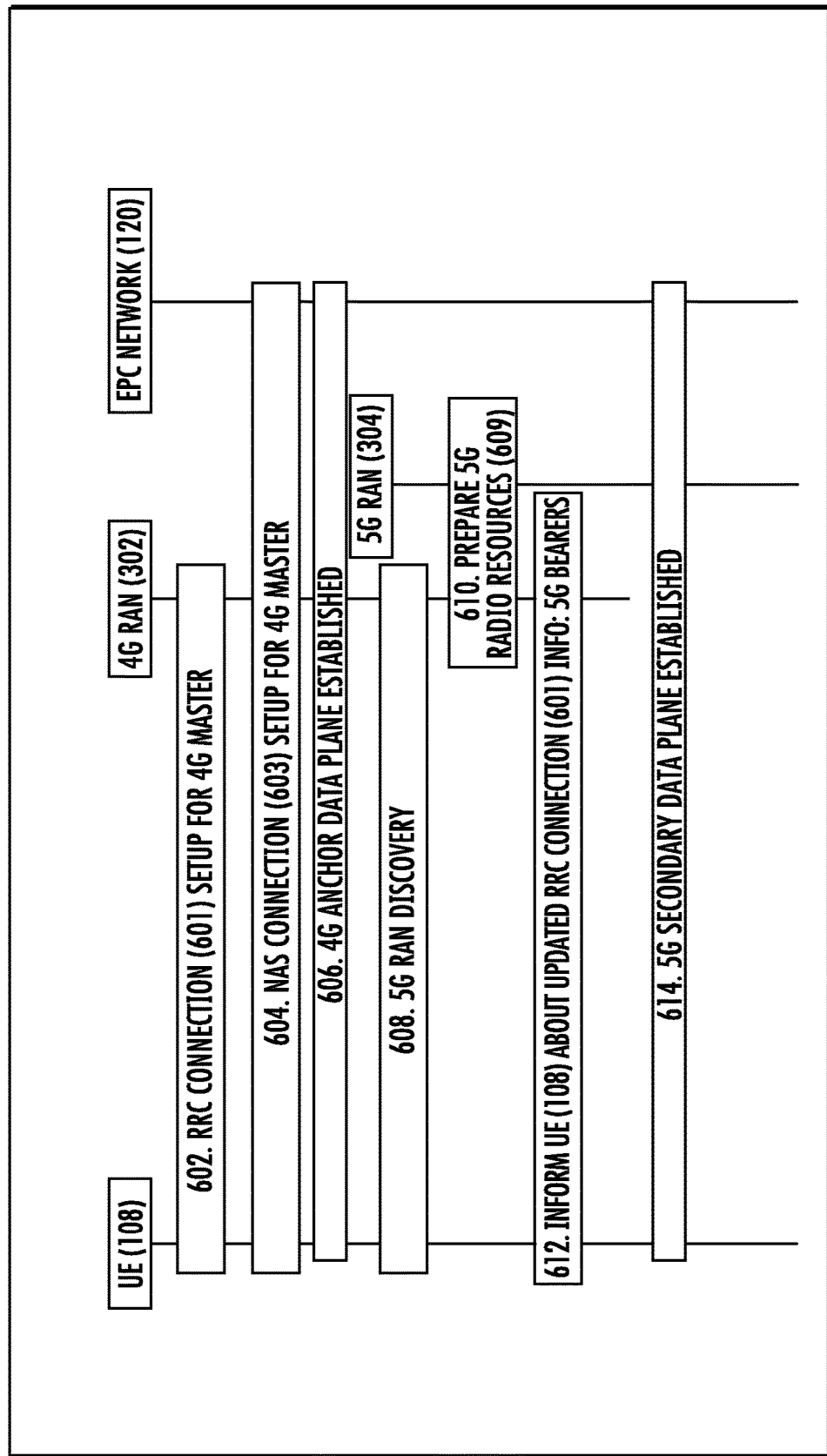
FIG. 6A is a flow diagram illustrating exemplary signaling in the 5G NSA radio access system in FIGS. 3A-3C between the user mobile communications device and the 4G RAN, and between the 4G RAN and the 5G RAN to establish the 4G master and 5G secondary data connections to the user mobile communications device.

FIG. 6A is a flow diagram 600 illustrating exemplary signaling in the 5G NSA radio access system 300 in FIGS. 3A-3C between the user mobile communications device 108 and the 4G RAN 302, and between the 4G RAN 302 and the 5G RAN 304 to establish the 4G master and 5G secondary data connections to the user mobile communications device 108. As shown in FIG. 6A, the user mobile communications device 108 discovers a 4G signal and sets up a 4G (LTE) RRC level connection 601 to a discovered 4G RAN 302 (block 602). This 4G connection will later serve as the master connection for the 5G secondary NSA connection.

The user mobile communications device 108 then sets up a NAS level connection 603 with the EPC network 120 over the 4G RRC connection 601 (block 604). This NAS level connection 603 setup may include steps such as authentication, and security setup, as well as establishment of data plane bearers via the 4G RAN 302. This establishes a 4G master data plane between the user mobile communications device 108 and the EPC network 120 (block 606). The user mobile communications device 108 discovers an available 5G RAN 304 (block 608). Discovery can be based on user mobile communications device 108 performed 5G measurements as instructed by the 4G RAN 302 via the existing 4G RRC connection 601. The 4G RAN 302 prepares dual connectivity for the user mobile communications device 108 and contacts the user mobile communications device 108 discovered 5G RAN 304 to request the 5G RAN 304 to assign radio and other resources 609 to support the secondary connection to the user mobile communications device 108 via the 5G RAN 304 (block 610). The 4G RAN 302 conveys the 5G RAN radio resource 609 configuration for the user mobile communications device 108 to the user mobile communications device 108 using the 4G RRC connection 601 (block 612). The user mobile communications device 108 connects to the 5G RAN 304 and enters the dual connectivity setup where user mobile communications device 108 is simultaneously connected via the 4G master data plane connection and the 5G secondary data plane connection (block 614). Based on the instructions received from 4G RAN 302, some data plane traffic may be routed via 5G RAN 304, and some data plane traffic may be routed via 4G RAN 302.

Figure 6B:
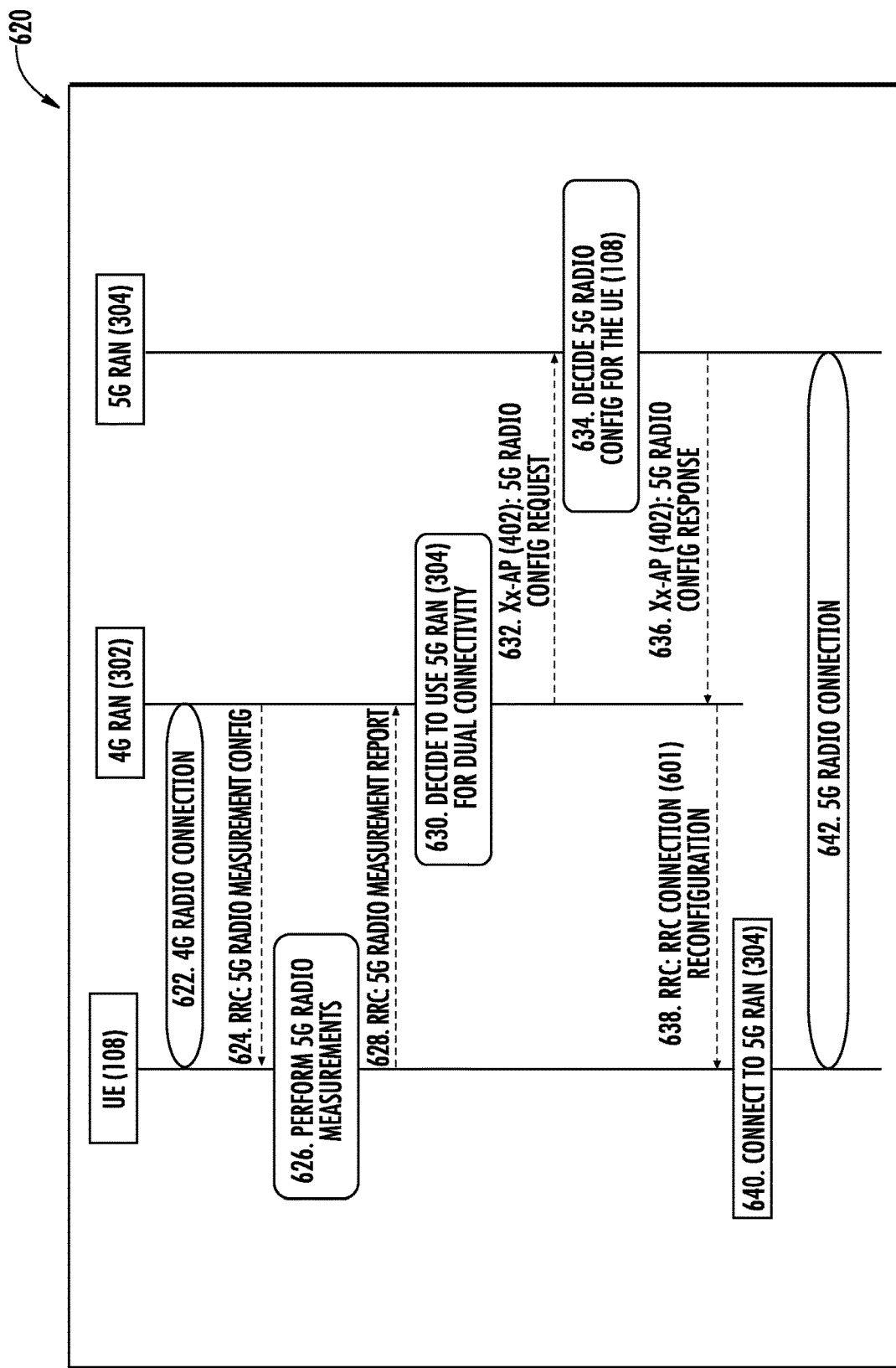
FIG. 6B is a flow diagram illustrating additional detail of exemplary signaling in the 5G NSA radio access system in FIGS. 3A-3C between the user mobile communications device and the 4G RAN, and between the 4G RAN and the 5G RAN to establish the 4G master and 5G secondary data connections to the user mobile communications device.

FIG. 6B is a flow diagram 620 illustrating additional detail of exemplary signaling in the 5G NSA radio access system 300 in FIGS. 3A-3C between the user mobile communications device 108 and the 4G RAN 302, and between the 4G RAN 302 and the 5G RAN 304 to establish the 4G master and 5G secondary data connections to the user mobile communications device 108. As shown in FIG. 6B, the user mobile communications device 108 is connected to the 4G RAN 302 via the RRC connection 601 (block 622). The 4G RAN 302 instructs the user mobile communications device 108 to measure 5G frequencies and to report back discovered 5G RANs 304 (block 624). This signaling can be performed using the RRC protocol between the user mobile communications device 108 and the 4G RAN 302. Messages such as RRC Connection Setup or RRC Connection Reconfiguration may be used. The user mobile communications device 108 performs 5G measurements as instructed by the 4G RAN 302 (block 626). The user mobile communications device 108 reports to the 4G RAN 302 information about the discovered 5G RANs 304 (block 628). This signaling may be performed using the RRC protocol between the user mobile communications device 108 and the 4G RAN 302 (block 628). Messages such as Measurement Report may be used. The 4G RAN 302 makes the decision to setup a 5G secondary NSA connection for the user mobile communications device 108 and thus makes the user mobile communications device 108 to be in dual connectivity mode between the 4G master connection and 5G secondary connection (block 630). The 4G RAN 302 contacts the reported 5G RAN 304 requesting the 5G RAN 304 to allocate necessary radio and other resources for the 5G secondary connection (block 632). This signaling may be performed over Xx signaling interface 308 (see FIGS. 3A and 3C) between the 4G RAN 302 and the 5G RAN 304. Signaling may be performed using Xx-AP protocol 402 (see FIG. 4A). The 5G RAN 304 allocates the radio and other resources for the 5G secondary connection being established for the user mobile communications device 108 (block 634). The 5G RAN 304 sends information about the allocated 5G RAN resources to the 4G RAN 302 (block 636). This signaling may be performed over Xx signaling interface 308 (see FIGS. 3A and 3C) between the 4G RAN 302 and the 5G RAN 304. Signaling may be performed using Xx-AP protocol 402 (see FIG. 4A). The information about the allocated 5G RAN 304 resources may be sent to the 4G RAN 302 in a container type of message, which is intended to be further passed to the user mobile communications device 108 by the 4G RAN 302. Container may include 5G specific or 5G aware RRC signaling messages, for example. The 4G RAN 302 sends the information about the allocated 5G RAN 304 resources to the user mobile communications device 108 (block 638). The user mobile communications device 108 connects to the 5G RAN 304 based on the received 5G RAN resource information (block 640), thereby establishing a 5G data plane connection between the user mobile communications device 108 and the 5G RAN 304 (block 642).

Figure 7:
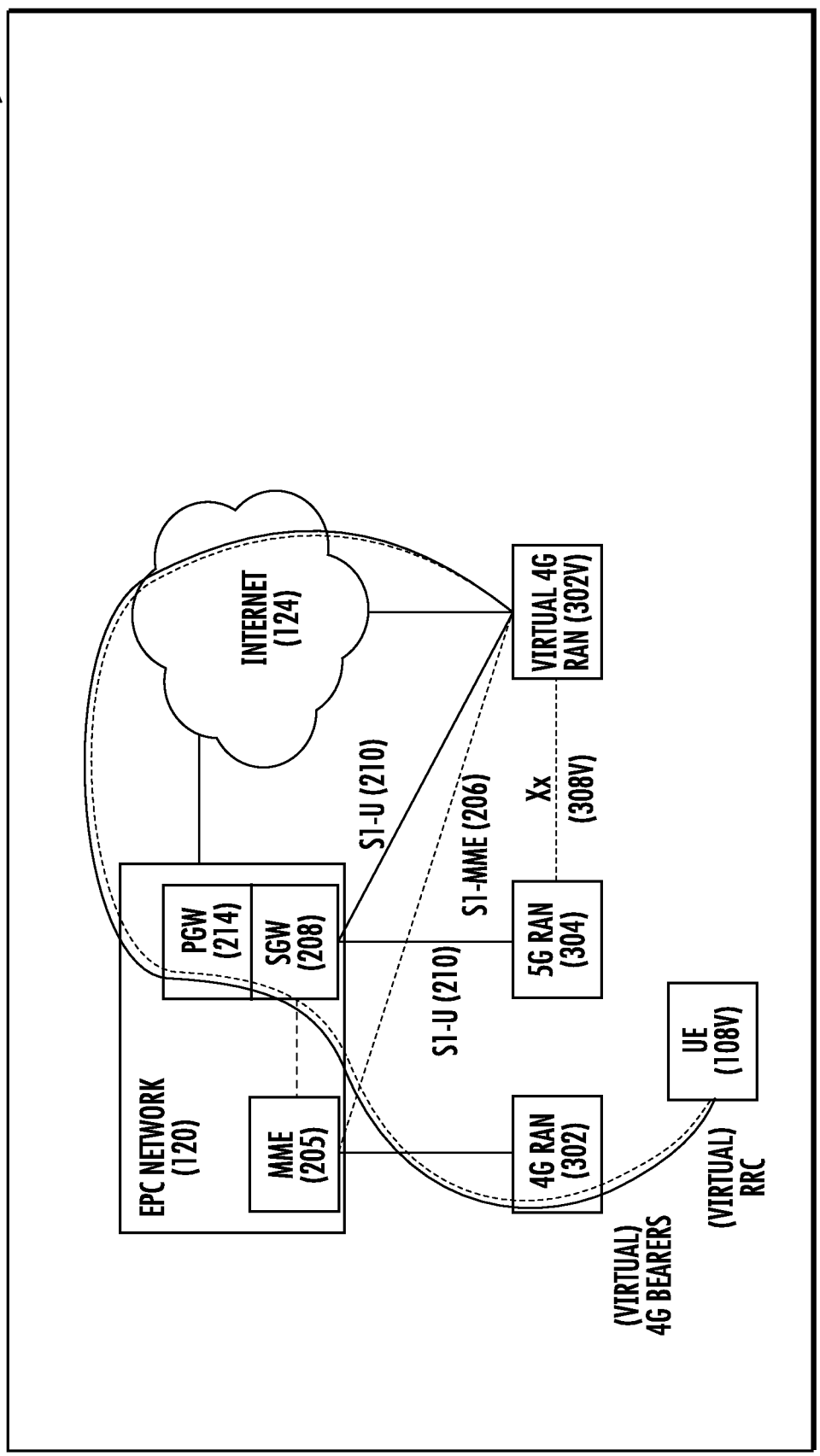
FIG. 7 illustrates an exemplary 5G NSA radio access system that includes a virtual 4G RAN in a virtual radio access system to provide a 4G master connection for signaling and data transfer based on 4G radio technology to a user mobile communications device, and 5G RAN in a 5G radio access system to provide a secondary data connection based on 5G radio technology to the user mobile communications device.

FIG. 7 illustrates a 5G NSA radio access system 700 that includes a virtual 4G RAN 302V, as opposed to an actual RAN like 4G RAN 302 in FIGS. 3A-3C, to provide a non-radio logical master connection for signaling and data transfer based on 4G signaling to a user mobile communications device 108V (labeled as "UE 108V"). For example, the virtual 4G RAN 302V may be provided as a RAN server. The 5G NSA radio access system 700 also includes the 5G RAN 304 to provide a secondary data connection based on 5G radio technology to the user mobile communications device 108V. The master and secondary connections established between the 5G NSA radio access system 700 and the user mobile communications device 108V establish data planes between the user mobile communications device 108V and the EPC network 120 (see also FIGS. 1 and 2). As discussed in more detail below, the 5G NSA radio access system 700 is able to establish a connection between a user mobile communications device 108V and the EPC network 120 via a dual connectivity setup, in which the virtual 4G RAN 302V provides the logical master connection based on an IP connection carried between the user mobile communications device 108V and the virtual 4G RAN 302V via an available transport network. The 5G RAN 304 provides a secondary connection based on 5G radio technology. The signaling protocol between the user mobile communications device 108V and the virtual 4G RAN 302V provides the control functionality related to the 5G secondary connectivity, as is the case when an actual 4G RAN 302 is used. In this manner, the deployment of the 5G NSA radio access system 700 employing the virtual 4G RAN 302V can be achieved without updating existing 4G RANs 302 and/or without the need to deploy a new 4G RAN infrastructure.

The functionality of the 5G RAN 304 in the 5G NSA radio access system 700 in FIG. 7 functionality is the same as described above in the 5G NSA radio access system 300 in FIGS. 3A-3C. The 5G RAN 304 need not be aware whether an actual 4G RAN or the virtual 4G RAN 302V is used as the master connection for the user mobile communications device 108V. The EPC network 120 acts as the core network for the 5G NSA connectivity as specified in 3GPP. In this role, the EPC network 120 does not, in principle, see any difference between the 5G NSA radio access system 700 employing the virtual RAN 302V compared to the 5G NSA radio access system 300 in FIGS. 3A-3C employing an actual 4G RAN 302. The available 4G network provides a transport solution for the traffic exchange between the user mobile communications device 108V and the virtual 4G RAN 302V. In this role, the 4G network operates as a plain data plane solution and it may be, in principle, unaware that the transport is used to carry 5G related information. The 5G NSA radio access system 700 contains two logically separate components. One or more 5G RANs 304 provide 5G secondary connectivity between the user mobile communications device 108V and the EPC network 120 as specified in 3GPP 5G NSA specifications. The 5G RAN 304 connects to the existing 4G core network (EPC) via standard S1 interfaces. One or more virtual 4G RANs 302V provide logical 4G master connectivity between the user mobile communications device 108V and the EPC network 120. The virtual 4G RAN 302V connects to the existing 4G core network (EPC) via standard S1 interfaces. The virtual 4G RAN 302V may be connected to the EPC network 120 exactly as if it were an actual 4G RAN. In a control plane, the S1-MME interface 206 is used, and in the data plane, the S1-U interface 210 is used. The virtual 4G RAN 302V also communicates with the 5G RAN 304 via an Xx interface 308V, exactly as if it were an actual 4G RAN 302. In a given deployment, some of the 5G RAN 304 and virtual 4G RAN 302V functions may be implemented in collocated fashion and thus the standard compliant Xx signaling interface 308V functionality may not be utilized within such an collocated implementation.

Figures 8A, 8B, 8C:
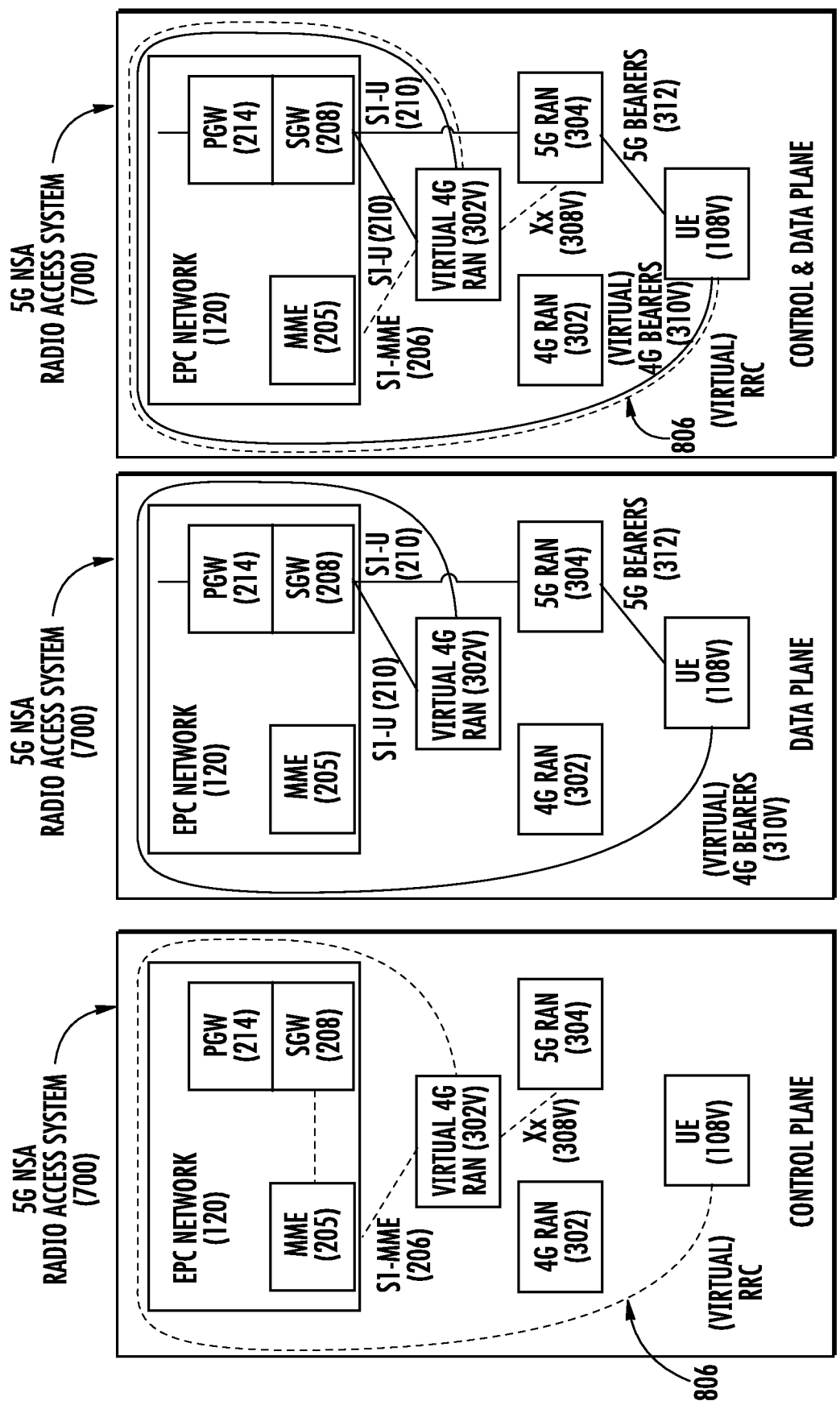
FIG. 8A illustrates an exemplary control plane of the 5G NSA radio access system in FIG. 7.
FIG. 8B illustrates an exemplary data plane of the 5G NSA radio access system employing the virtual 4G RAN in FIG. 7.
FIG. 8C illustrates the control plane and data plane of the 5G NSA radio access system employing the virtual 4G RAN in FIGS. 8A and 8B.

FIG. 8A illustrates a control plane supported by the 5G NSA radio access system 700 and established between the user mobile communications device 108V and the EPC network 120. Control signaling 806 (e.g., Non Access Stratum (NAS) signaling or RRC signaling) between the user mobile communications device 108V and the EPC network 120 or the virtual 4G RAN 302V is carried over the 4G master connection. This control signaling 806 includes also the signaling related to the discovery, establishment, maintenance, and tear down of the 5G radio technology based secondary connection between the user mobile communications device 108V and the 5G RAN 304. Instead of transporting the control signaling 806 directly over actual 4G L2/L1 radio connection, it is transported for example, via an IP connection between the virtual 4G RAN 302V and the user mobile communications device 108V. The IP connection is then carried over an available transport network between the user mobile communications device 108V and the virtual 4G RAN 402V. The purpose of the shown control signaling 806 in the control plane protocols is to facilitate the discovery, establishment, maintenance, and tear down of the 5G NSA secondary connection between user mobile communications device 108V and the 5G RAN 304. The control signaling 806 is not managing any actual 4G radio connection, and thus parameters not related to the 5G secondary connection can in principle be omitted or ignored. To facilitate 5G related signaling between the user mobile communications device 108V and the virtual 4G RAN 302V, an Xx signaling interface 308V exists within the network between the virtual 4G RAN 302V and the 5G RAN 304. The Xx signaling interface 308V is utilized by the virtual 4G RAN 302V to request and receive 5G radio configuration for a user mobile communications device 108V for which a 5G secondary based radio connection is being established or modified.

FIG. 8B illustrates a data plane established between the user mobile communications device 108V and the EPC network 120 in the 5G NSA radio access system 700. The virtual 4G RAN 302V may also provide data plane transport capabilities between itself and the user mobile communications device 108V, although this may not always be necessary. Virtual 4G bearers 310V, if utilized, are encapsulated, for example to an IP connection, between the virtual 4G RAN 302V and the user mobile communications device 108V and transported between the user mobile communications device 108V and the virtual 4G RAN 302V, for example by the same transport network that is utilized to transport the RRC signaling 806. The rest of the data plane bearers are 5G bearers 312 based on 5G radio technology and are routed via the 5G secondary connection through the 5G RAN 304. As shown in FIG. 3B, the virtual 4G and 5G data bearers 310V, 312 are transported between the EPC network 120 and the user mobile communications device 108 directly via the appropriate virtual 4G RAN or 5G RAN 302V, 304. In other configurations not illustrated, it is possible to transport the 5G data bearers 312 via the 4G RAN 302. FIG. 8C illustrates both the control plane and data plane supported by the 5G NSA radio access system 700 and established between the user mobile communications device 108V and the EPC network 120 shown in FIGS. 8A and 8B. From the above description, it can be seen that in principle the EPC network 120 and the 5G RAN 304 do not need to be aware that a virtual 4G RAN 302V, instead of an actual 4G RAN 302, is utilized. The EPC core network 120 and the 5G RAN 304 may support multiple virtual 4G RANs 302V, multiple actual 4G RANs 302, and any combinations thereof.

Figure 9A:
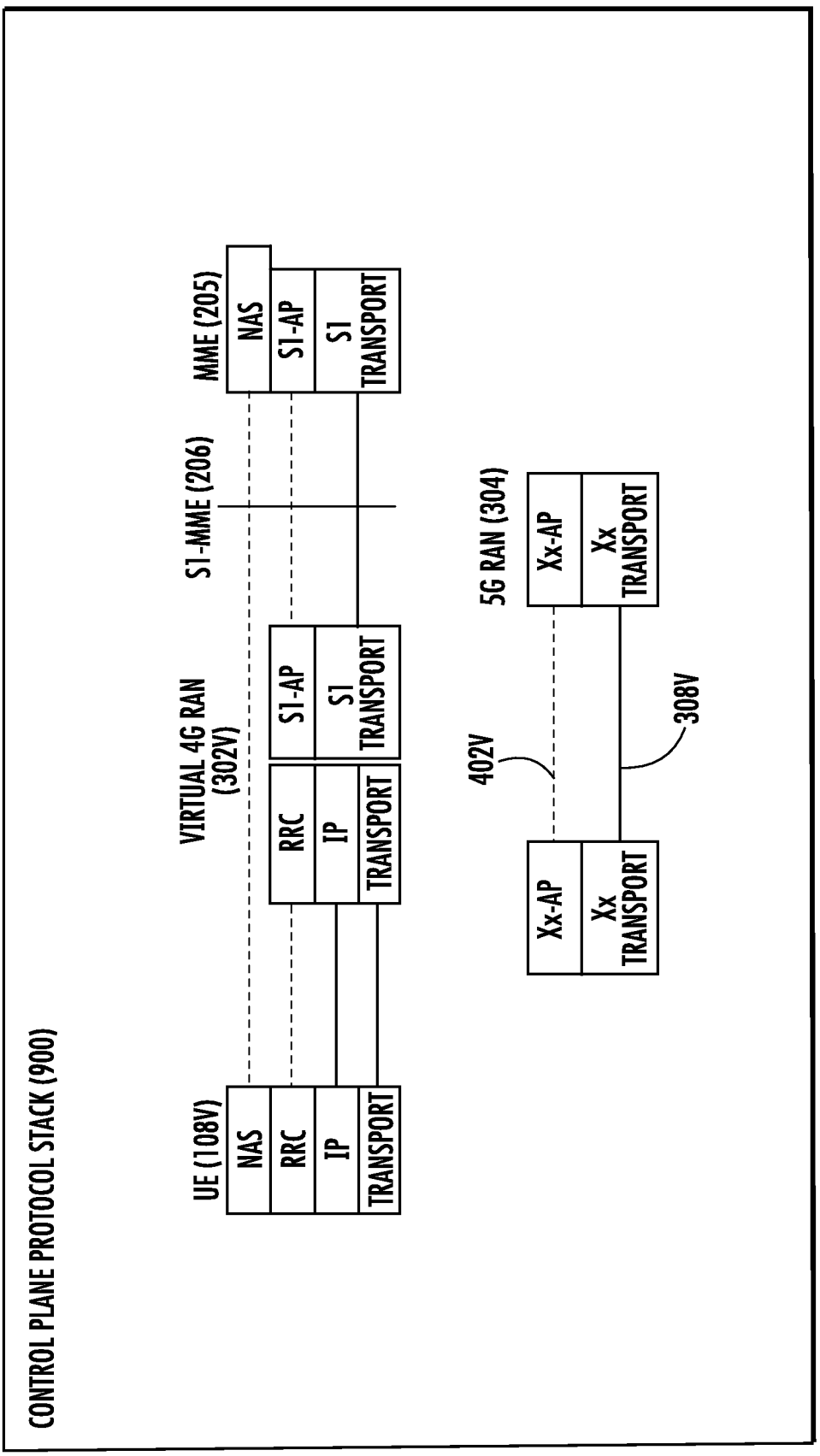
FIG. 9A is a block diagram illustrating an exemplary 5G NSA control plane protocol stack implemented in the 5G NSA radio access system employing the virtual 4G RAN in FIGS. 7-8C, wherein control signaling is provided between the virtual 4G RAN and the user mobile communications device to setup and control radio resources for a virtual 4G master connection to the virtual 4G RAN and 5G secondary data connection to the 5G RAN, respectively.

FIG. 9A is a block diagram illustrating an exemplary control plane protocol stack 900 implemented in the 5G NSA radio access system 700 employing the virtual 4G RAN 302V in FIGS. 7-8C, wherein control signaling is provided between the virtual 4G RAN 302V and the user mobile communications device 108V to setup and control radio resources for a virtual 4G master connection to the virtual 4G RAN 302V and 5G secondary data connection to the 5G RAN 304, respectively. A difference to the 5G NSA control plane protocol stack 400 in FIG. 4A is that instead of transporting the RRC connection over actual 4G L2/L1 connection, it is transported, for example, via an IP connection between the virtual 4G RAN 302V and the user mobile communications device 108V. The IP connection is then carried over an available transport network between the user mobile communications device 108V and the virtual 4G RAN 302V. The purpose of the shown RRC connection in this control plane protocol stack 900 is to just facilitate the discovery, establishment, maintenance, and tear down of the 5G NSA secondary connection between user mobile communications device 108V and the 5G RAN 304. The RRC connection is not managing any actual 4G radio connection, and thus parameters not related to the 5G secondary connection can in principle be omitted or ignored. The other control plane functionality is in principle similar to the control plane protocol stack 400 in FIG. 4A implemented for the 5G NSA radio access system 300.

Figure 9B:
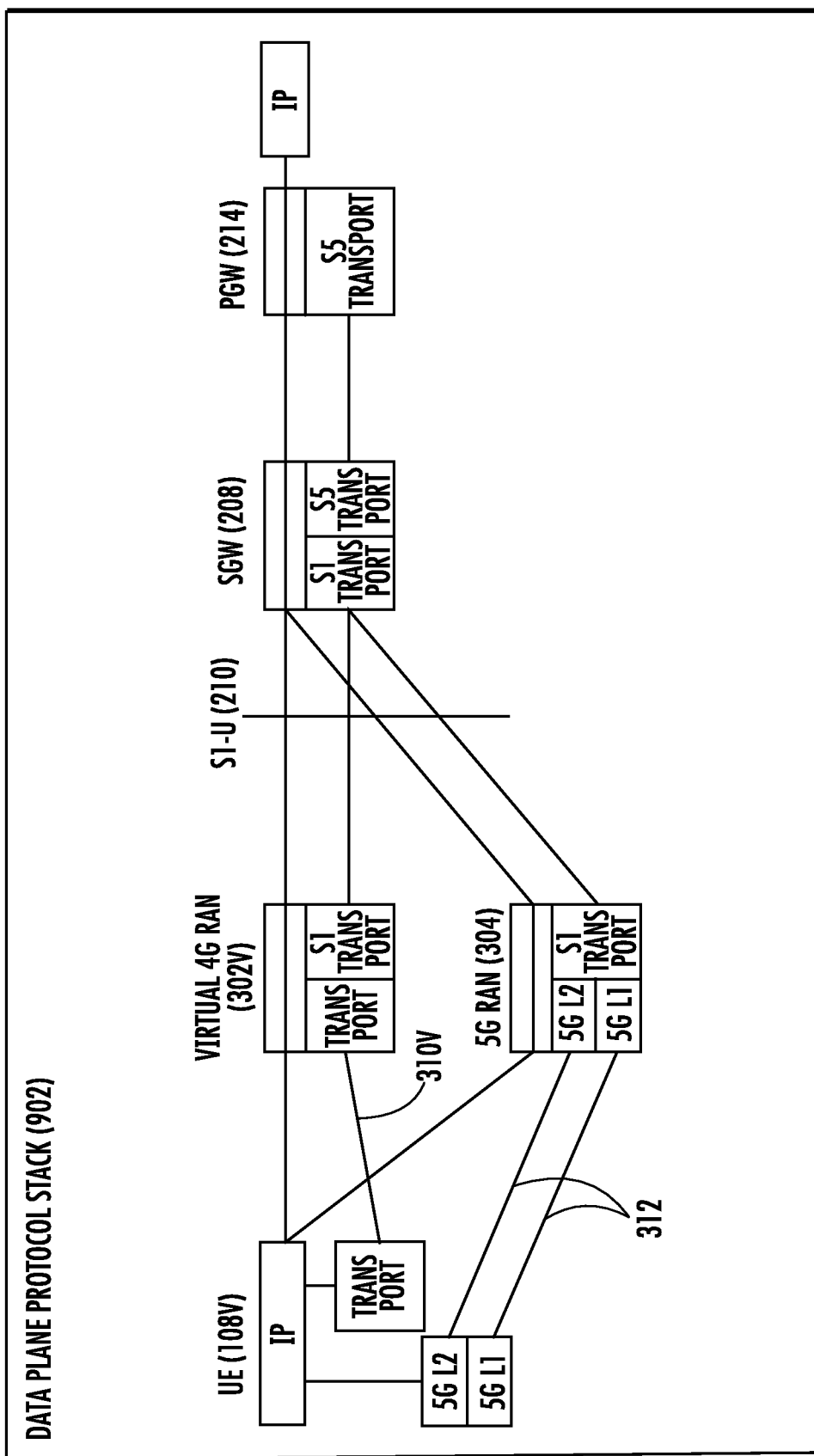
FIG. 9B is a block diagram illustrating an exemplary 5G NSA data plane protocol stack implemented in the 5G NSA radio access system employing the virtual 4G RAN in FIGS. 7-8C, wherein data paths are provided between the virtual 4G RAN and the user mobile communications device for a 4G master data connection, and between the 5G RAN and the user mobile communications device for 5G secondary data connection.

FIG. 9B is a block diagram illustrating an exemplary data plane protocol stack 902 implemented in the 5G NSA radio access system 700 employing the virtual 4G RAN 302V in FIG. 7-8C. The actual 4G RAN is replaced by the virtual 4G RAN 302V. The virtual 4G RAN 302V communicates with the user mobile communications device 108V, not directly using the 4G L2/L1, but another transport solution carrying the possible data plane traffic. Other common components between the data plane protocol stack 902 in FIG. 9B and the data plane protocol stack 404 in FIG. 4B are shown with common element numbers and are not re-described.

Figure 10:
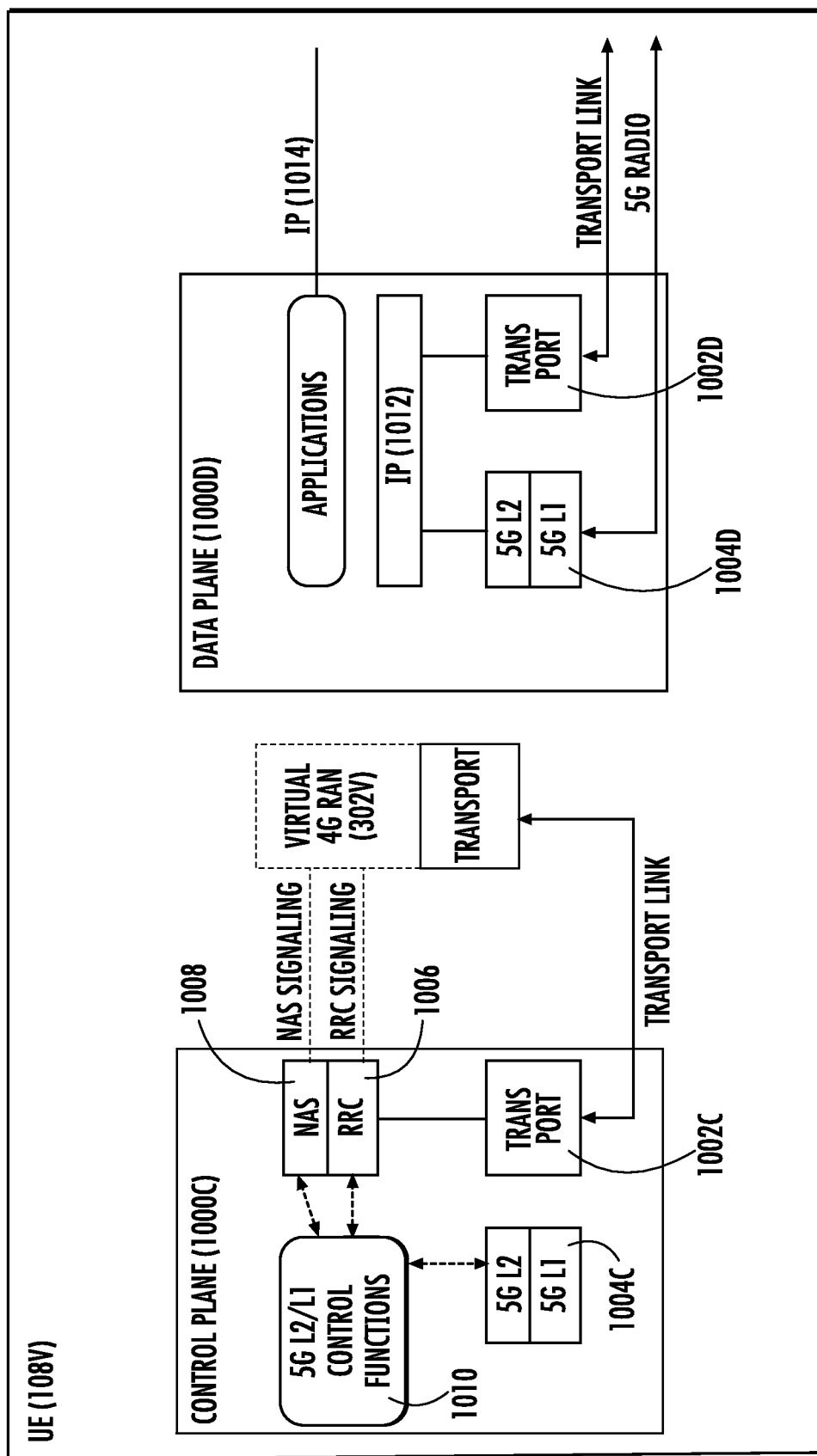
FIG. 10 is a diagram illustrating exemplary control plane and data plane circuits that can be provided in a user mobile communications device to support connectivity to the 5G NSA radio access system employing the virtual 4G RAN according to the control plane and data plane protocol stack implementations in FIGS. 9A and 9B.

FIG. 10 is a diagram illustrating exemplary control plane and data plane circuits that can be provided in a user mobile communications device 108V to support connectivity to the 5G NSA radio access system 700 in FIGS. 7-8C. Note that an actual user mobile communications device 108V implementation may be different from this example provided for illustrative purposes. As shown in FIG. 10, the user mobile communications device 108V includes a control plane 1000C that includes non-radio logical control circuit(s) 1002C to provide control for establishing a non-radio transport connection instead of directly using 4G L2/L1 enabling transporting control plane between the user mobile communications device 108V and an actual 4G RAN. The control plane 1000C also includes 5G L2/L1 control circuit(s) 1004C to provide 5G L2/L1 control functions 1010 enabling transporting control plane between the user mobile communications device 108V and the 5G RAN 304. 4G control plane Layer 3 signaling termination functions, namely RRC 1006 and NAS 1008 are supported. RRC termination enables Layer 3 control plane 1000C signaling with the virtual 4G RAN 302V. NAS termination enables control plane 1000C signaling with the EPC network 120. The user mobile communications device 108V also includes a data plane 1000D that includes a non-radio data transport circuit(s) 1002D to enable a non-radio transporting data plane between the user mobile communications device 108V and the virtual 4G RAN 302V. 5G L2/L1 data circuits 1004D are provided in the data plane 1000D to configure and manage the 5G L2/L1 functionality based on the instructions received via the 4G control plane 1000C Layer 3 signaling. IP termination circuit(s) 1012 enabled to carry application specific IP data 1014 to and from the EPC network 120 using non radio transport data circuit(s) 1002D or/and 5G L2/L1 data circuits 1004D.

Figure 11A:
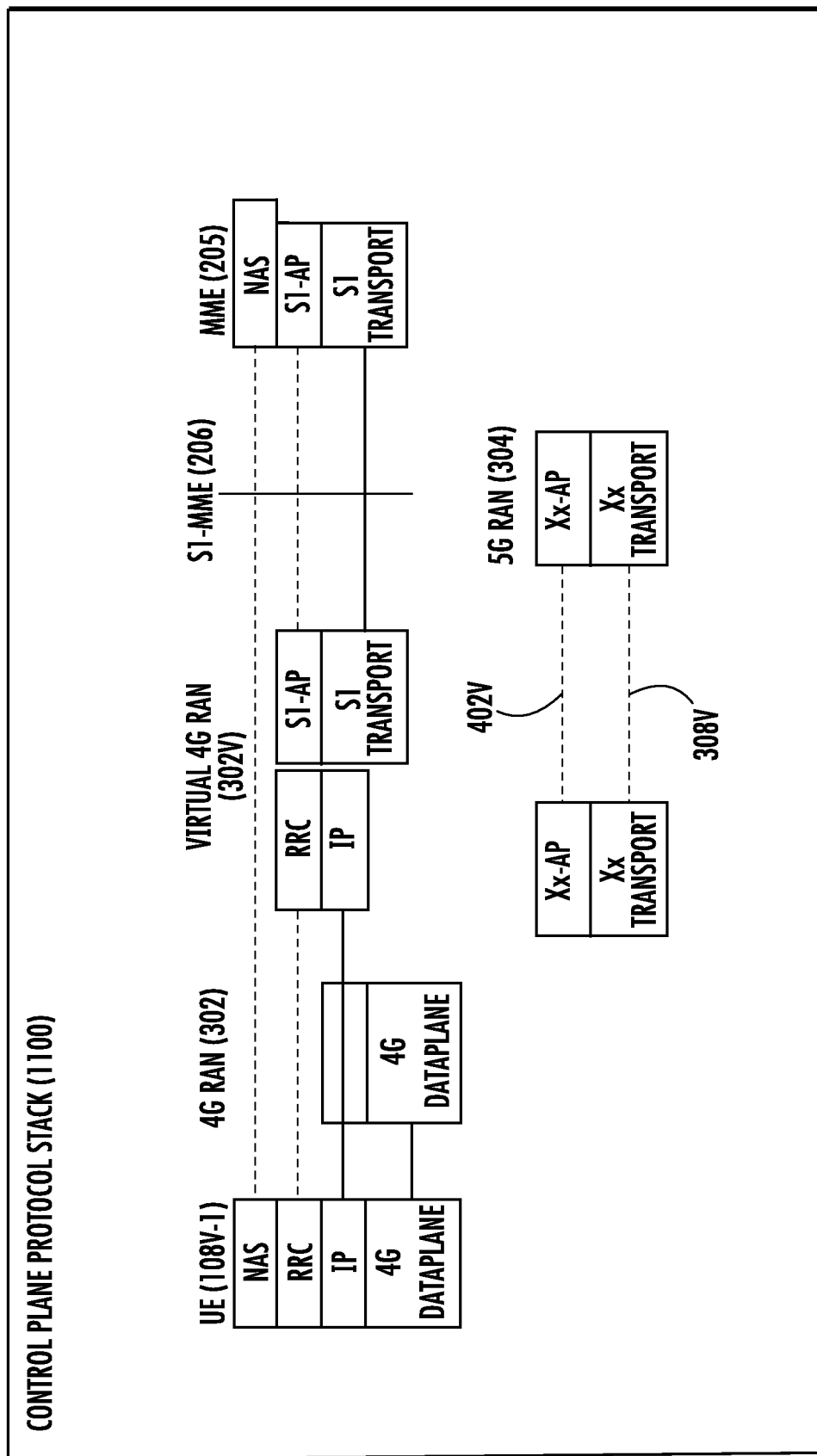
FIG. 11A is a block diagram illustrating an exemplary 5G NSA control plane protocol stack implemented in the 5G NSA radio access system employing the virtual 4G RAN in FIGS. 7-8C, wherein control signaling is provided between the virtual 4G RAN and the user mobile communications device over a legacy 4G RAN to setup and control radio resources for a virtual 4G master connection to the virtual 4G RAN and 5G secondary data connection to the 5G RAN, respectively.

FIG. 11A is a block diagram illustrating a similar control plane protocol stack 1100 as provided in the control plane protocol stack 900 in FIG. 9A that can also be employed by the 5G NSA radio access system 700 shown in FIGS. 7, 8A and 8C. In FIG. 11A, the IP connection between a user mobile communications device 108V-1 and the virtual 4G RAN 302V is carried to and from the user mobile communications device 108V-1 using an existing 4G network via a 4G RAN 302. The existing 4G network, including the actual 4G RAN 302, acts as a pure transport solution and may be generally unaware of what information it is carrying. The establishment of the transport connection between the user mobile communications device 108V-1 and the existing 4G network is logically separate from the 5G NSA connectivity. For example, the 5G NSA radio access system 700 operates as over-the-top service compared to the transport 4G connection. Instead of using 4G as the transport network, also other cellular, wireless, or even wired connections could be used as the transport network without changing the basic principles of the described 5G NSA radio access system 700 employing a virtual 4G RAN 302V to support establishing a logical 4G master connection between the user mobile communications device 108V-1 and the virtual 4G RAN 302V. Use of 4G as the transport solution can be advantageous as the user mobile communications device 108V-1 does not need any wired connection and can reuse the user mobile communications device 108V-1 hardware required for a traditional 5G NSA radio access system used for the 4G master connection as the hardware providing the transport solution for the logical master connection to the virtual 4G RAN 302V.

Figure 11B:
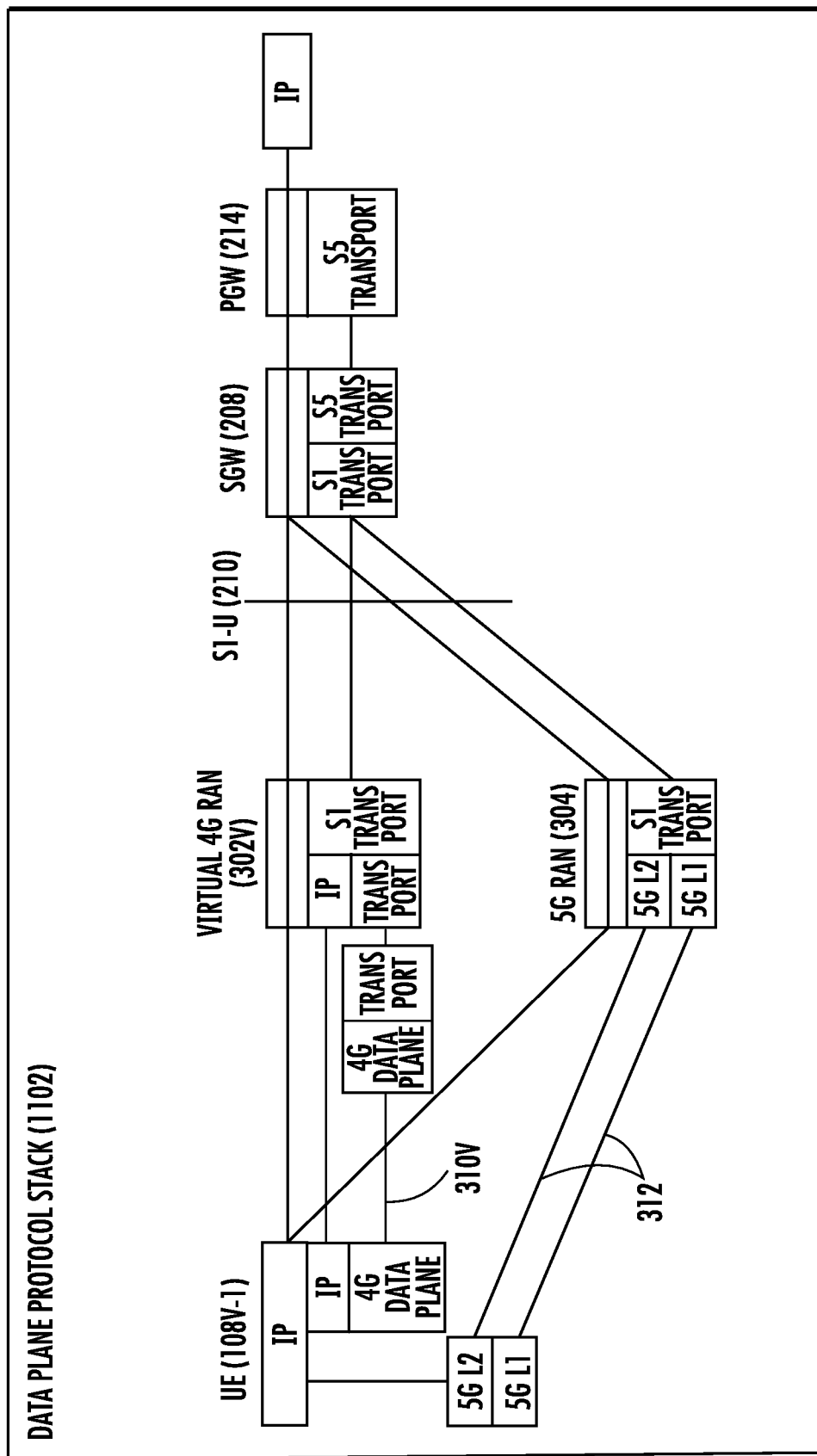
FIG. 11B is a block diagram illustrating an exemplary 5G NSA data plane protocol stack implemented in the 5G NSA radio access system employing the virtual 4G RAN in FIGS. 7-8C, wherein data paths are provided between the virtual 4G RAN and the user mobile communications device over a legacy 4G RAN for a 4G master data connection, and between the 5G RAN and the user mobile communications device for 5G secondary data connection.

FIG. 11B is a block diagram illustrating another exemplary 5G NSA data plane protocol stack 1102 that can be implemented in the 5G NSA radio access system 700 employing the virtual 4G RAN 302V in FIGS. 7-8C. The transport connection between the user mobile communications device 108V-1 and the virtual 4G RAN 302V is based on IP connectivity that is carried to and from the user mobile communications device 108V-1 using an existing 4G network. The existing 4G network acts as a pure transport solution and is generally unaware of what information it is carrying.

Figure 12A:
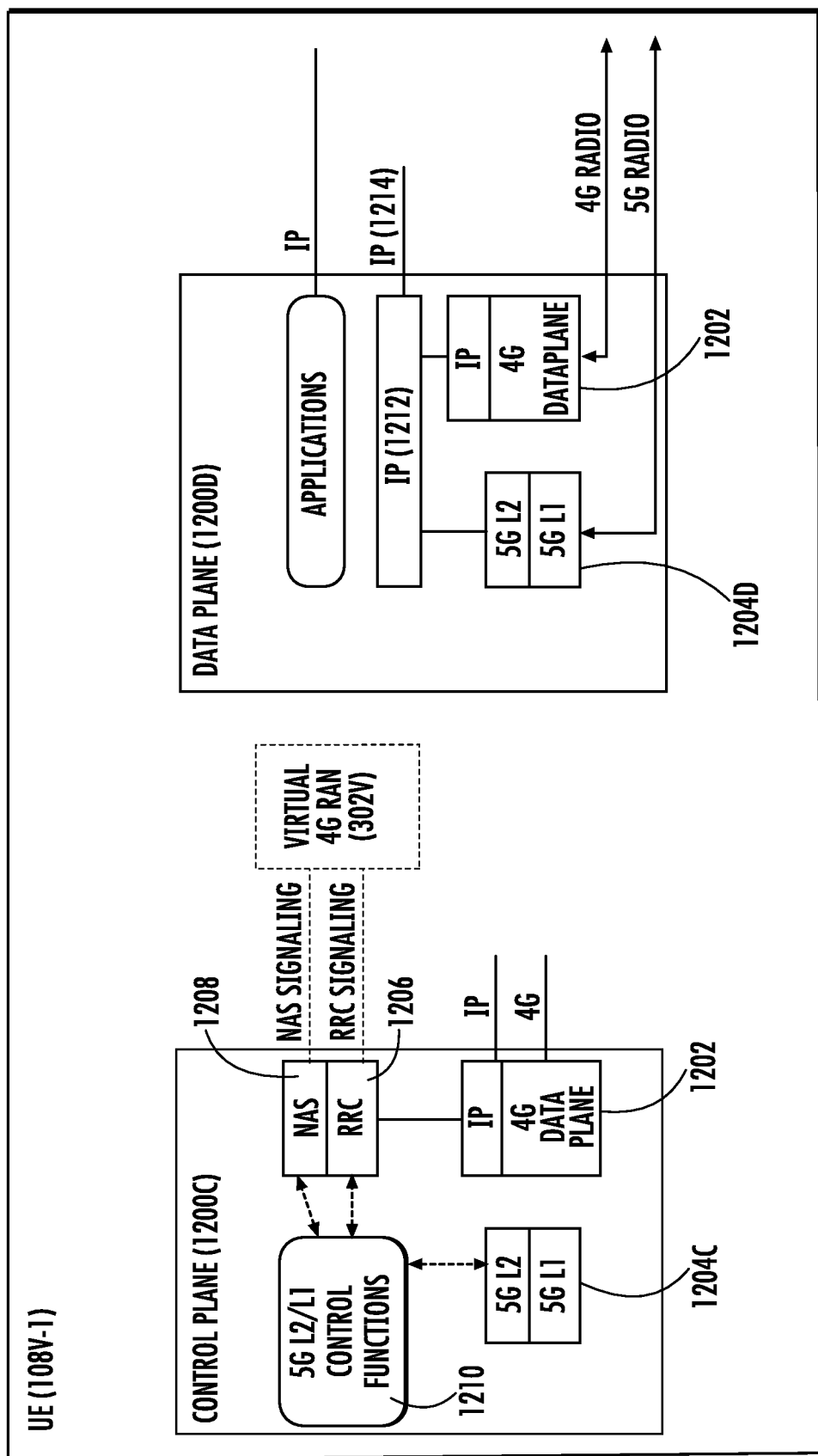
FIG. 12A is a diagram illustrating exemplary control plane and data plane circuits that can be provided in a user mobile communications device to support connectivity to the 5G NSA radio access system employing the virtual 4G RAN in FIGS. 7-8C according to the control plane and data plane protocol stack implementations in FIGS. 11A and 11B.

FIG. 12A is a diagram illustrating exemplary control plane and data plane circuits 1200C, 1200D that can be provided in a user mobile communications device 108V-1 to support connectivity to the 5G NSA radio access system 700 employing the virtual 4G RAN 302V in FIGS. 7-8C according to the control plane and data plane protocol stacks 1100, 1102 in FIGS. 11A and 11B. As shown in FIG. 12A, the user mobile communications device 108V-1 includes a control plane 1200C that includes a 4G IP circuit 1202 to provide a control plane and data plan for establishing a 4G radio transport connection between the user mobile communications device 108V-1 and the virtual 4G RAN 302V. The control plane 1200C also includes 5G control circuit 1204C to provide 5G L2/L1 control functions 1210 enabling transporting control plane between the user mobile communications device 108V-1 and the 5G RAN 304. 4G control plane Layer 3 signaling termination functions, namely RRC 1206 and NAS 1208 are supported. RRC termination enables Layer 3 control plane 1200C signaling with the virtual 4G RAN 302V. NAS termination enables control plane 1200C signaling with the EPC network 120 via the virtual 4G RAN 302V. The user mobile communications device 108V-1 also includes a data plane 1200D that includes the 4G IP circuit 1202 to enable a non-radio transporting data plane between the user mobile communications device 108V and the virtual 4G RAN 302V. A 5G data circuit 1204D is provided in the data plane 1200D to configure and manage the 5G L2/L1 functionality based on the instructions received via the 4G control plane 1200C Layer 3 signaling. IP termination circuit(s) 1212 is enabled to carry application specific IP data 1214 to and from the EPC network 120 using the 4G IP circuit 1202 and/or the 5G data circuit 1204D.

Figure 12B:
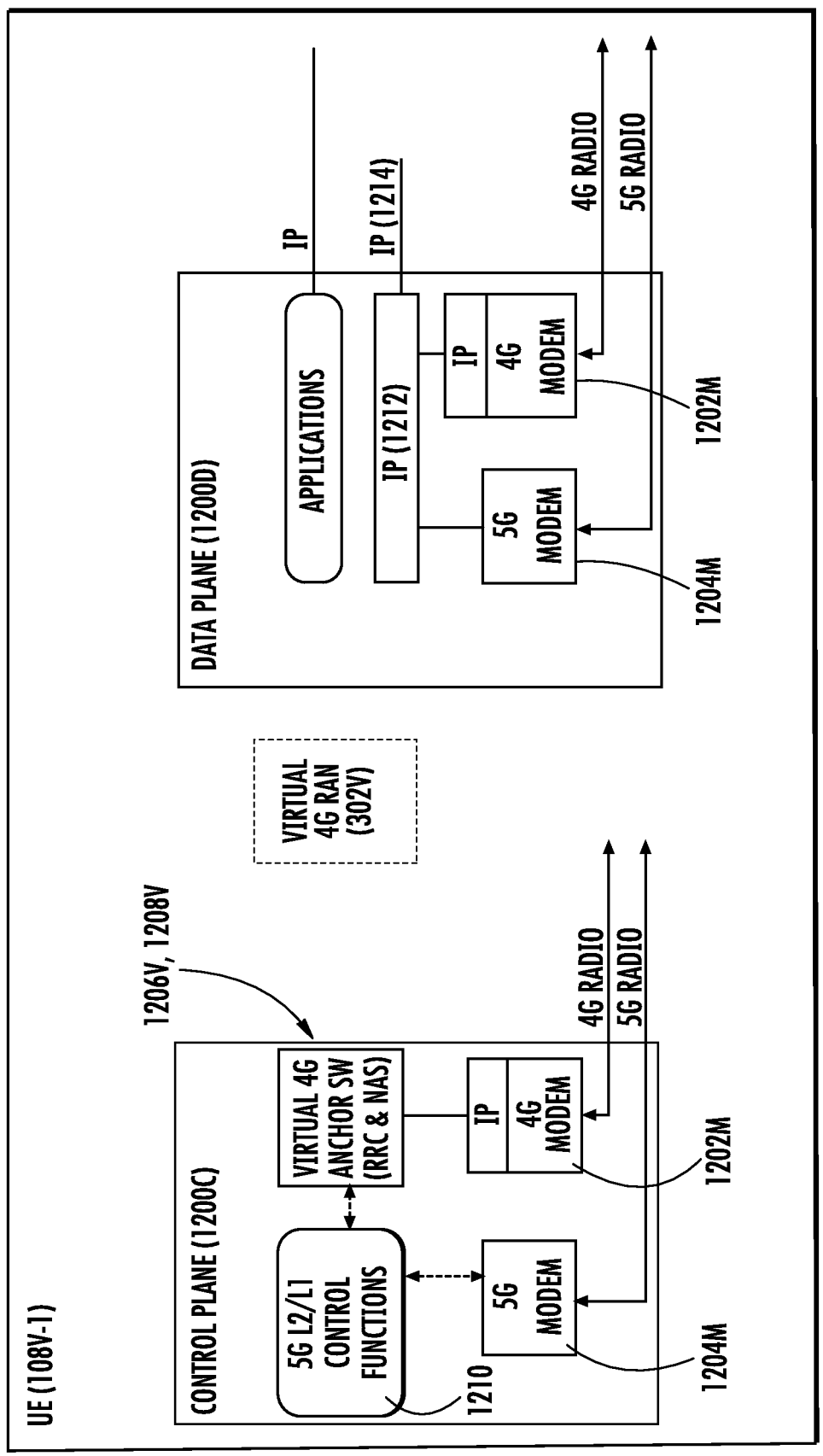
FIG. 12B is a diagram illustrating other exemplary control plane and data plane circuits that can be provided in a user mobile communications device to support connectivity to the 5G NSA radio access system employing the virtual 4G RAN in FIGS. 7-8C according to the exemplary control plane and data plane protocol stack implementations in FIGS. 11A and 11B.

FIG. 12B is a diagram illustrating an exemplary control plane and data plane circuits 1200C, 1200D that can be provided in a user mobile communications device 108V-1 to support connectivity to the 5G NSA radio access system 700 employing the virtual 4G RAN 302V in FIGS. 7-8C according to the control plane and data plane protocol stacks 1100, 1102 in FIGS. 11A and 11B. As shown in FIG. 12A, the user mobile communications device 108V-1 includes a control plane 1200C that includes a 4G modem 1202M to provide control for establishing a 4G radio transport connection between the user mobile communications device 108V-1 and the virtual 4G RAN 302V. The control plane 1200C also includes a 5G modem 1204M to provide 5G L2/L1 control functions 1210 enabling transporting control plane between the user mobile communications device 108V-1 and the 5G RAN 304. 4G control plane Layer 3 signaling termination functions, namely RRC 1206V and NAS 1208V are supported. RRC termination enables Layer 3 control plane 1200C signaling with the virtual 4G RAN 302V. NAS termination enables control plane 1200C signaling with the EPC network 120. The user mobile communications device 108V-1 also includes a data plane 1200D that includes the 4G modem 1202M to enable a non-radio transporting data plane between the user mobile communications device 108V-1 and the virtual 4G RAN 302V. The 5G modem 1204M is provided in the control plane 1200C to configure and manage the 5G L2/L1 functionality based on the instructions received via the 4G control plane 1200C Layer 3 signaling. IP termination circuit(s) 1212 is enabled to carry application specific IP data 1214 to and from the EPC network 120 using the 4G modem 1202M and/or the 5G modem 1204M.

Figure 13A:
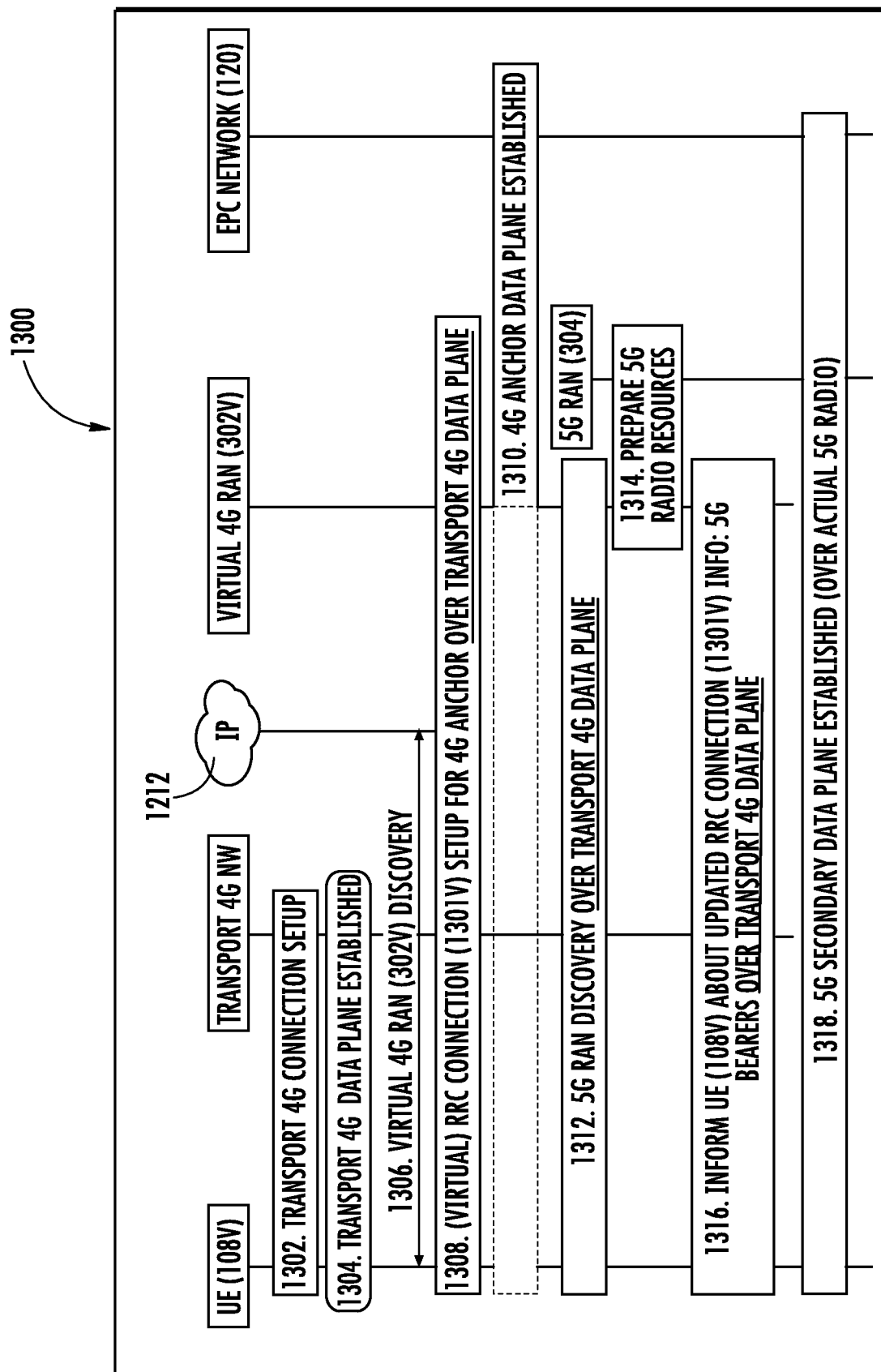
FIG. 13A is a flow diagram illustrating exemplary signaling in the 5G NSA radio access system employing the virtual 4G RAN in FIGS. 7-8C between the user mobile communications device and the virtual 4G RAN using a 4G RAN transport, and between the virtual 4G RAN and the 5G RAN to establish the 4G master and 5G secondary data connections to the user mobile communications device according to the exemplary control plane and data plane protocol stack implementations in FIGS. 9A and 9B.

FIG. 13A is a flow diagram 1300 illustrating exemplary signaling in the 5G NSA radio access system 700 in FIGS. 7-8C between the user mobile communications device 108V and the virtual 4G RAN 302V, and between the virtual 4G RAN 302V and the 5G RAN 304 to establish the 4G master and 5G secondary data connections to the user mobile communications device 108V. In FIG. 13A, it is assumed that the transport connection used for the virtual 4G master connection is a 4G data plane. In this regard, as shown in FIG. 13A, the user mobile communications device 108V discovers an available 4G network and connects to it (block 1302). This 4G network connection may require USIM credentials. These USIM credentials may be hosted at the same or different UICC card as what is used for the USIM application utilized to setup the 5G NSA connectivity via the virtual 4G master connection. This transport 4G connection may be established towards a specific APN that is configured to operate as transport connection for the virtual 4G master connection used for the 5G NSA radio access system 700. When the user mobile communications device 108V has connected to the 4G network, the transport connection for the virtual 4G master connection is established (block 1304). The user mobile communications device 108V uses the established transport connection to discover the virtual 4G RAN 302V (block 1306). This can be based, for example, on a dynamic name system (DNS) or dynamic host configuration protocol (DHCP) query. After discovering the virtual 4G RAN 302V, the user mobile communications device 108V RRC client establishes master RRC connection 1301V with its peer RRC entity located at the virtual 4G RAN 302V (block 1308). The purpose of this master RRC connection is to facilitate the 5G NSA secondary connection via the 5G RAN 304. After RRC connection 1301V establishment, NAS connection is also established between the user mobile communications device 108V and the EPC network 120. This NAS signaling is the same as the 5G NSA radio access system 300 in FIGS. 3A-3C with an actual 4G master connection, as shown in FIG. 6A.

With continuing reference to FIG. 13A, after execution of block 1308, a data plane via the virtual 4G RAN 302V exists between the user mobile communications device 108V and the EPC network 120 (block 1310). The subsequent steps shown in blocks 1312-1318 can be the same as steps 608-614 in FIG. 6A illustrating the 5G secondary connection being established in the 5G NSA radio access system 300. In this case, the RRC signaling is not required for the actual management of the underlying 4G L2/L1 configuration as such direct 4G L2/L1 connectivity is not required. To facilitate interoperability between the user mobile communications device 108V and the virtual 4G RAN 302V, a predefined set of such signaling can be exchanged, or both entities may simply ignore some of the parameters and other information that are not applicable for the deployment with virtual 4G master connection.

Figure 13B:
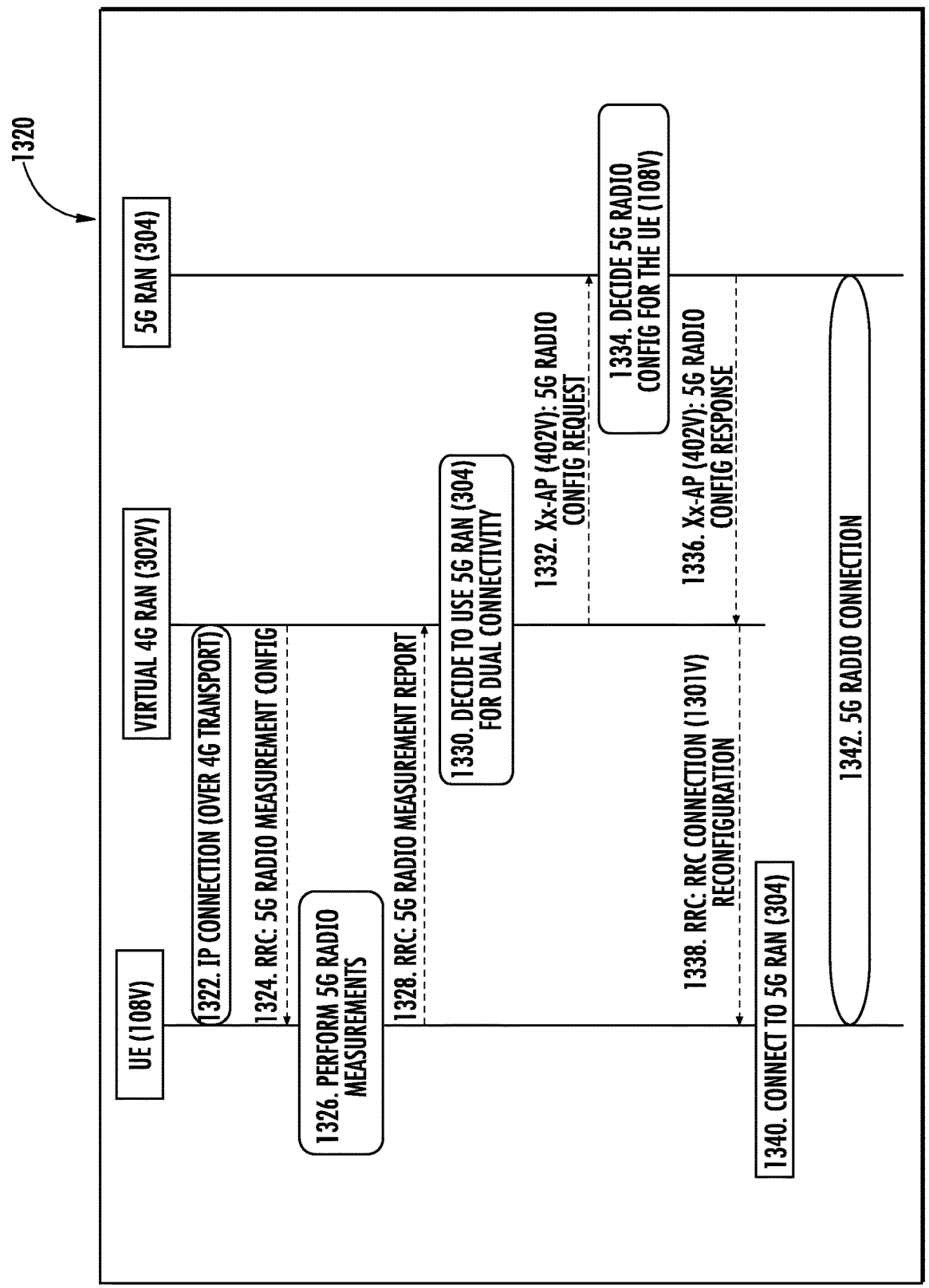
FIG. 13B is a flow diagram illustrating additional exemplary detail of signaling in the 5G NSA radio access system employing the virtual 4G RAN in FIGS. 7-8C between the user mobile communications device and the 4G RAN using a 4G RAN transport, and between the 4G RAN and the 5G RAN to establish the 4G master and 5G secondary data connections to the user mobile communications device according to the exemplary control plane and data plane protocol stack implementations in FIGS. 9A and 9B.

FIG. 13B is a flow diagram 1320 illustrating additional detail of exemplary signaling in the 5G NSA radio access system 700 in FIGS. 7-8C between the user mobile communications device 108V and the virtual 4G RAN 302V, and between the virtual 4G RAN 302V and the 5G RAN 304 to establish the 4G master and 5G secondary data connections to the user mobile communications device 108V. FIG. 13B illustrates the more detailed steps within the user mobile communications device 108V for allocation of the 5G radio resources and setting up the secondary connection for the dual connectivity situation in the case when a virtual 4G RAN 302V is utilized. The signaling in bocks 1322-1342 in FIG. 13B is identical to the signaling utilized when an actual 4G RAN 302 is used as the master connection as blocks 622-642 shown in FIG. 6B. In FIG. 13B however, it may be possible to exchange only the RRC signaling, which is related to the 5G secondary connection as actual direct 4G L2/L1 is not being used. In this signaling flow in FIG. 13B, the virtual 4G RAN 302V plays the role of the actual 4G RAN 302 in FIG. 6B.

Figure 14:
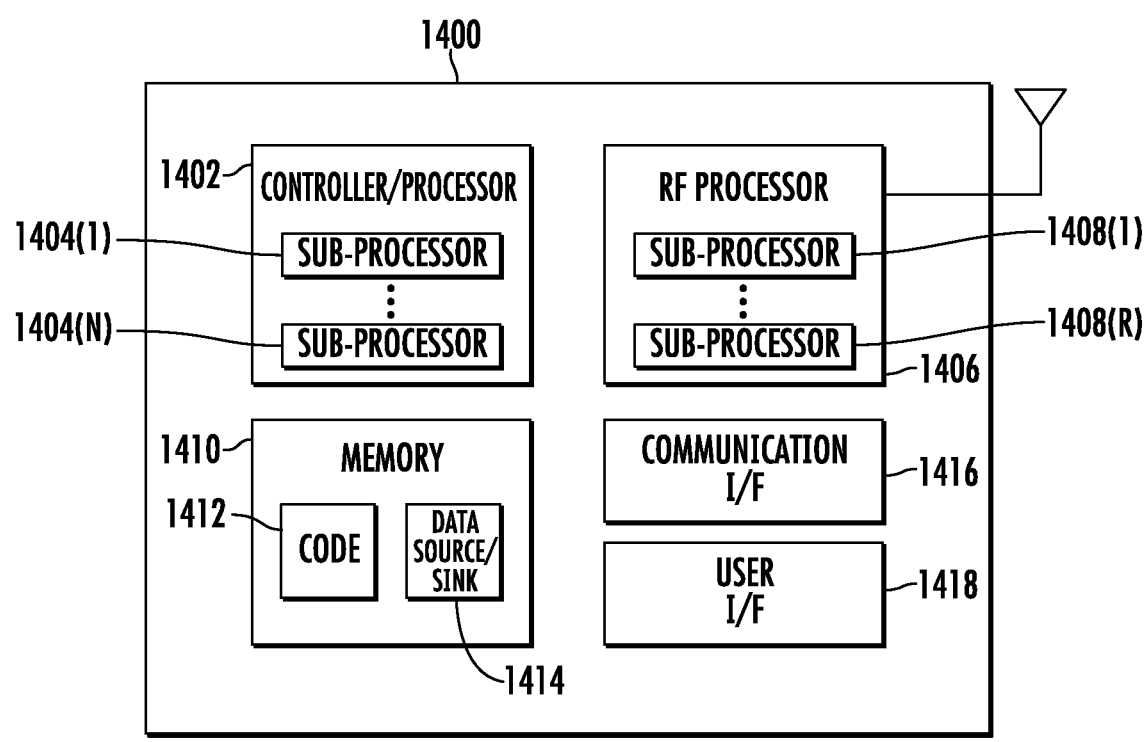
FIG. 14 is a schematic diagram of an exemplary computer system that can be implemented in a RAN, including an actual or virtual RAN, and/or a user mobile communications device in a 5G NSA radio access system to provide a 4G master connection and a 5G secondary data connection to a user mobile communications device to provide a 4G and 5G data plane between the user mobile communications device and a core network, wherein the computer system is adapted to execute instructions from an exemplary computer readable link.

FIG. 14 shows a simplified functional block diagram 1400 of illustrative computer system that can be employed in a RAN, including an actual 4G RAN 302 or virtual 4G RAN 302V, the 5G RAN 304, and/or a user mobile communications device 108V in a 5G NSA radio access system 700 described in the examples in FIGS. 7-13B above. A controller/processor 1402 typically handles high level processing. The controller/processor 1402 may include one or more sub-processors 1404(1)-1404(N) or cores that are configured to handle specific tasks or functions. An RF processor 1406 implements various signal processing functions for the downlink including the lower level L1 processing. The RF processor 1406 may include one or more sub-processors 1408(1)-1408(R) or cores that are configured to handle specific tasks or functions. A memory 1410 is a computer-readable medium that stores computer-readable code 1412 that is executable by one or more processors including the controller/processor 1402 and/or the RF processor 1406. The memory 1410 may also include various data sources and data sinks (collectively represented by element 1414) that may provide additional functionalities.

The code 1412 in typical deployments is arranged to be executed by the one or more processors to facilitate the discovery of a neighbor radio access system or cells reporting to a serving RAN. The code 1412 additionally enables implementation of both the dedicated PCI identity and common PCI identity using the same hardware infrastructure in a given dual identity cell when executed. The hardware infrastructure may also include various interfaces (I/Fs) including a communication I/F 1416 which may be used, for example, to implement a link to the services node 114 (FIG. 1), LAN, or to an external processor, control, or data source. In some cases, a user I/F 1418 may be utilized to provide various indications such as power status or to enable some local control of features or settings. The RF processor 1406 may be eliminated in some applications and any functionality that it provides that is needed to implement the services node 114 may be provided by the controller/processor 1402.

While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A virtual radio access node (RAN) for supporting and establishing a dual connection for a user mobile communications device of a master connection to a virtual RAN in a first virtual radio access system and a secondary connection to a secondary RAN, the virtual RAN configured to:

establish a master connection between the user mobile communications device and the first virtual radio access system over a transport connection;
receive a report comprising information related to the secondary RAN in a second radio access system by the user mobile communications device;
receive radio resource configuration information from the secondary RAN to support the secondary connection between the secondary RAN and the user mobile communications device;
communicate at least part of the radio resource configuration information to the user mobile communications device for the user mobile communications device to establish the secondary connection to the secondary RAN; and
receive the radio resource configuration information from the secondary RAN to support the secondary connection between the secondary RAN and the user mobile communications device over a signaling interface between the virtual RAN and the secondary RAN.

2. A virtual radio access node (RAN) for supporting and establishing a dual connection for a user mobile communications device of a master connection to a virtual RAN in a first virtual radio access system and a secondary connection to a secondary RAN, the virtual RAN configured to:
establish a master connection between the user mobile communications device and the first virtual radio access system over a transport connection;
receive a report comprising information related to the secondary RAN in a second radio access system by the user mobile communications device;
receive radio resource configuration information from the secondary RAN to support the secondary connection between the secondary RAN and the user mobile communications device;
communicate at least part of the radio resource configuration information to the user mobile communications device for the user mobile communications device to establish the secondary connection to the secondary RAN;
communicate control signaling to the user mobile communications device over the transport connection for the user mobile communications device;
communicate data signaling to the user mobile communications device over the transport connection for the user mobile communications device to exchange data; and
communicate additional data signaling to the user mobile communications device over the secondary connection for the user mobile communications device to exchange data.

3. The virtual RAN of claim 1, further configured to respond to a request from the user mobile communication device to establish the master connection over the transport connection.

4. A virtual radio access node (RAN) for supporting and establishing a dual connection for a user mobile communications device of a master connection to a virtual RAN in a first virtual radio access system and a secondary connection to a secondary RAN, the virtual RAN configured to:
establish a master connection between the user mobile communications device and the first virtual radio access system over a transport connection;
receive a report comprising information related to the secondary RAN in a second radio access system by the user mobile communications device;
receive radio resource configuration information from the secondary RAN to support the secondary connection between the secondary RAN and the user mobile communications device;
communicate at least part of the radio resource configuration information to the user mobile communications device for the user mobile communications device to establish the secondary connection to the secondary RAN; and
establish the master connection between the user mobile communications device and the first virtual radio access system over the transport connection by being further configured to send a dynamic name system (DNS) query or a dynamic host configuration protocol (DHCP) query over the first virtual radio access system.

5. The virtual RAN of claim 1 configured to establish the master connection through an internet protocol (IP) transport connection on a network.

6. The virtual RAN of claim 1 configured to establish the master connection through an over-the-air transport connection on a network.

7. The virtual RAN of claim 1 configured to establish the master connection between the user mobile communications device and the first virtual radio access system over the transport connection comprising a radio resource control (RRC) connection.

8. The virtual RAN of claim 1 further configured to send instructions to the user mobile communications device over the master connection to measure at least one frequency to discover the secondary RAN.

9. A method of operating a virtual radio access node (RAN) in a first virtual radio access system to establish a master connection between a user mobile communications device to the virtual RAN and a secondary connection to a secondary RAN in a second radio access system, comprising:
establishing a master connection between the user mobile communications device and the first virtual radio access system over a transport connection;
receiving a report comprising information related to the secondary RAN in the second radio access system by the user mobile communications device;
receiving radio resource configuration information from the secondary RAN to support the secondary connection between the secondary RAN and the user mobile communications device; and
communicating at least part of the radio resource configuration information to the user mobile communications device for the user mobile communications device to establish the secondary connection to the secondary RAN;
wherein establishing the master connection between the user mobile communications device and the first virtual radio access system over the transport connection further comprises sending a dynamic name system query or a dynamic host configuration protocol (DHCP) query over the first virtual radio access system.

10. The method of claim 9, further comprising:
communicating control signaling to the user mobile communications device over the transport connection for the user mobile communications device;
communicating data signaling to the user mobile communications device over the transport connection for the user mobile communications device to exchange data; and communicating additional data signaling to the user mobile communications device over the secondary connection for the user mobile communications device to exchange data.

11. The method of claim 9, further comprising responding to a request from the user mobile communication device to establish the master connection over the transport connection.

12. The method of claim 9 further comprising establishing the master connection through an internet protocol (IP) transport connection on a network.

13. The method of claim 9 further comprising establishing the master connection through an over-the-air transport connection on a network.

14. The method of claim 9, wherein establishing the master connection between the user mobile communications device and the first virtual radio access system over the transport connection comprises establishing a radio resource control (RRC) connection between the user mobile communications device and the first virtual radio access system over the transport connection.

15. The method of claim 9, further comprising sending instructions to the user mobile communications device over the master connection to measure at least one frequency to discover the secondary RAN.

16. The method of claim 9, comprising receiving the radio resource configuration information from the secondary RAN to support the secondary connection between the secondary RAN and the user mobile communications device over a signaling interface between the virtual RAN and the secondary RAN.

17. The method of claim 16, further comprising sending instructions to the user mobile communications device over the master connection to measure at least one frequency to discover the secondary RAN.

18. The method of claim 16, further comprising responding to a request from the user mobile communication device to establish the master connection over the transport connection.

\* \* \* \* \*

UNITED STATES PATENT AND TRADEMARK OFFICE
CERTIFICATE OF CORRECTION

| | |
|---|---|
| PATENT NO. | : 11,304,126 B2 |
| APPLICATION NO. | : 16/915543 |
| DATED | : April 12, 2022 |
| INVENTOR(S) | : Kalle Ahmavaara and Yash Dandekar |

It is certified that error appears in the above-identified patent and that said Letters Patent is hereby corrected as shown below:

In the Specification

On Column 23, Line 48, delete "distributed antenna"

Signed and Sealed this
Twentieth Day of September, 2022

*Katherine Kelly Vidal*

Katherine Kelly Vidal
*Director of the United States Patent and Trademark Office*